US012758969B2

(12) United States Patent
Pugia

(10) Patent No.: US 12,758,969 B2
(45) Date of Patent: Oct. 13, 2026

(54) SYSTEM AND METHOD FOR SENSING, CAPTURE AND RELEASE OF BIOMOLECULES OR CELLS

(71) Applicant: Indiana Biosciences Research Institute, Inc., Indianapolis, IN (US)

(72) Inventor: Michael J. Pugia, Pagosa Springs, CO (US)

(73) Assignee: Indiana Biosciences Research Institute, Inc., Indianapolis, IN (US)

( * ) Notice: Subject to any disclaimer, the term of this patent is extended or adjusted under 35 U.S.C. 154(b) by 734 days.

(21) Appl. No.: 17/917,828

(22) PCT Filed: Oct. 16, 2020

(86) PCT No.: PCT/US2020/055931
§ 371 (c)(1),
(2) Date: Oct. 7, 2022

(87) PCT Pub. No.: WO2021/206752
PCT Pub. Date: Oct. 14, 2021

(65) Prior Publication Data

US 2023/0158488 A1 May 25, 2023

Related U.S. Application Data

(60) Provisional application No. 63/006,833, filed on Apr. 8, 2020.

(51) Int. Cl.
*B01L 3/00* (2006.01)
*G01N 1/40* (2006.01)

(52) U.S. Cl.
CPC ........ *B01L 3/50255* (2013.01); *G01N 1/4077* (2013.01); *B01L 2200/12* (2013.01);
(Continued)

(58) Field of Classification Search
CPC ......... B01L 2200/12; B01L 2300/0645; B01L 2300/0681; B01L 2400/049; B01L 3/50255; G01N 1/4077; G01N 2001/4088
See application file for complete search history.

(56) References Cited

U.S. PATENT DOCUMENTS 5,454,472 A 10/1995 Benecke et al.
6,051,380 A 4/2000 Sosnowski et al.
(Continued)

FOREIGN PATENT DOCUMENTS

WO 2018191534 A1 10/2018

OTHER PUBLICATIONS

Chen et al., "High-sensitivity electrochemical enzyme-linked assay on a microfluidic interdigitated microelectrode", Biosens Bioelectron., 2011, pp. 1-15, vol. 26:11.
(Continued)

*Primary Examiner* — Jennifer Wecker
(74) *Attorney, Agent, or Firm* — The Webb Law Firm

(57) ABSTRACT

Collection of target analytes from complex samples is performed in detection microwell which includes a size exclusion filter and allows incubating the target analyte with affinity agents for a target analyte for capture and removal of non-target molecules. Detection of the target analytes by collection of the complexes in close proximity to a working electrode and a reference electrode facilitates the detection electrochemical labels produced.

18 Claims, 6 Drawing Sheets

(52) U.S. Cl.
CPC .................. *B01L 2300/0645* (2013.01); *B01L 2300/0681* (2013.01); *B01L 2400/049* (2013.01); *G01N 2001/4088* (2013.01)

(56) References Cited

U.S. PATENT DOCUMENTS

| | | | |
|---|---|---|---|
| 7,087,148 | B1 | 8/2006 | Blackburn et al. |
| 2008/0023324 | A1 | 1/2008 | Ban et al. |
| 2008/0138890 | A1 | 6/2008 | Horiike et al. |
| 2009/0071830 | A1* | 3/2009 | Vann ................ G01N 27/44782 204/627 |
| 2013/0059308 | A1 | 3/2013 | Makarova et al. |
| 2013/0210131 | A1 | 8/2013 | Renken |
| 2013/0309679 | A1 | 11/2013 | Ismagilov et al. |
| 2014/0008210 | A1* | 1/2014 | Guia .................... G01N 33/491 204/518 |
| 2015/0060353 | A1* | 3/2015 | Neijzen ............ B01L 3/502753 29/17.3 |
| 2018/0080932 | A1 | 3/2018 | Goldberg et al. |
| 2018/0283998 | A1 | 10/2018 | Pugia et al. |
| 2018/0313847 | A1 | 11/2018 | Pugia et al. |
| 2019/0307940 | A1 | 10/2019 | Chen |
| 2020/0124508 | A1* | 4/2020 | Mendoza ............. G01N 33/492 |
| 2022/0364076 | A1* | 11/2022 | Kameoka .......... B01L 3/502761 |

OTHER PUBLICATIONS

Kim et al., "Fabrication of comb interdigitated electrodes array (IDA) for a microbead-based electrochemical assay system", Biosensors and Bioelectronics, 2004, pp. 887-894, vol. 20.

Matylitskaya et al., "Electrochemical Characterization of Nanogap Interdigitated Electrode Arrays for Lab-on-a-Chip Applications", Journal of The Electrochemical Society, 2018, pp. B127-B134, vol. 165:3.

Partel et al., "Novel fabrication process for sub-micron interdigitated electrode arrays for highly sensitive electrochemical detection", Sensors and Actuators, 2014, pp. 193-198, vol. B 205.

Pugia et al., "Multiplexed SIERRA Assay for the Culture-Free Detection of Gram-Negative and Gram-Positive Bacteria and Antimicrobial Resistance Genes", Anal Chem, 2021, pp. 1-20, vol. 93:17.

* cited by examiner

SYSTEM AND METHOD FOR SENSING, CAPTURE AND RELEASE OF BIOMOLECULES OR CELLS

CROSS-REFERENCE TO RELATED APPLICATION

This application is the United States national phase of International Application No. PCT/US2020/055931 filed Oct. 16, 2020, and claims priority to U.S. Provisional Patent Application No. 63/006,833 filed Apr. 8, 2020, the disclosures of which are hereby incorporated by reference in their entirety.

BACKGROUND OF THE INVENTION

Field of the Invention

Disclosed herein are systems and methods for sample processing that allows isolation of biomolecules or cells from complex samples by filtration though a microwell electrode capable of electrochemical detection by immunoassay and selective affinity capture. The systems and methods find application for bio-analysis of complex samples and enables processing, biomolecule capture and electrochemical immunoassay detection (EC-IA) and are able to process whole blood, serum, plasma, urine, wound fluid, bronchial lavage, and sputum specimens and other complex biological samples allowed form 1 μL to 10 mL and detect biomolecules or cells on a microwell sensor.

Description of Related Art

The detection of target analytes is an important aspect of many scientific endeavors. A wide variety of analytes may be the subject of such detection methods and systems. In a particular aspect, for example, the detection of analytes in biological samples is important to the understanding and treatment of various medical conditions. Methods and systems have been described for the detection of such analytes.

Rare molecules are molecules which occur in the range of 1 to 50,000 copies per 10 μL or less of a liquid sample. The detection of rare molecules cannot be achieved by conventional affinity assays, which require molecular copy numbers far above those found for rare molecules. For example, immunoassays cannot typically achieve a detection limit of 1 picomolar (pM) or less. Immunoassays are limited by the affinity binding constant of an antibody, which is typically not higher than $10^{-12}$ (1 pM). Immunoassays require at least a 100-fold antibody excess as the off-rate is generally $10^{-13}$ and a complete binding of all analyte in a sample is limited by antibody solubility. This same issue of antibody solubility prevents conventional immunoassays from reaching femtamolar detection levels.

The detection of rare molecules that are cell-bound or contained within a cell is also important in medical applications, such as in the diagnosis of diseases that can be propagated from a single cell. The detection of circulating rare molecules is complicated by the sample including a mixture of rare and non-rare molecules. The materials can be cellular, e.g. internal to cells, or "cell free" material not bound to or associated with any intact cell. Cell free rare molecules are important in medical applications such as, for example, diagnosis of cancer in tissues. In the case of cancer, rare molecules are shed from tissues into circulation. It is understood that cell free rare molecules correlate to the total amount of rare molecules in diseased tissues, for example tumors, distributed throughout the body.

Analysis of cell free molecules requires isolation and detection of circulating rare molecules from a very small fraction of all molecules in a sample. When cell free molecules are shed into the peripheral blood from diseased cells in tissues, these molecules are mixed with molecules shed from healthy cells. For example, approximately $10^9$ cells are present in 1 $cm^3$ of diseased tissue. If this tissue mass was fully dissolved into 5 L of blood (blood volume of an average adult), this would only be 2 million cells per 10 mL of blood. This would be considered rare, considering that there are an average of 75 million leukocytes and 50 billion erythrocytes per 10 mL of blood, each of which releases non-rare molecules.

Multiplexing is another problem for immunoassay methods as most methods use optical detection labels—whether chemiluminescent, fluorescent, or colorimetric—which provide a limited number of resolvable signals for simultaneous measurement within the same analysis. For this reason, analysis of hundreds to thousands of variations is a problem for optical systems. These methods require multiple, separate measurements in multiplexed panels and arrays, which increases cost and complexity.

The field requires an improved method capable of detecting all variations of peptides and proteins in a sample. This method should not be dependent on further enzymatic processing or peptidase reactions, and should be able to measure any and all variations of an analyte in a single determination. A new method which combines affinity agents and analytical labeling must be sensitive to variations of peptides and proteins in a sample and allow for consistent measurement across patients and samples.

SUMMARY OF THE INVENTION

In some non-limiting embodiments or examples, there is provided an analyte detection microwell for electrochemical detection of target analytes. The analyte detection microwell includes a size exclusion filter, electrochemical detector, and affinity agents for a target analyte for capture and detection. The affinity agent for detection is attached to a reagent capable of generating an electrochemical label. The affinity agent for capture is attached to a reagent capable of binding a surface in the microwell. The electrochemical label is detected by a working and reference electrode placed in the microwell to measure label formed by the affinity agent for detection.

The collection methods disclosed herein include isolating target analytes from non-target analytes in complex samples in microwell with a size exclusion filter. Target analytes couple with the affinity agent(s), forming complex(es) which may be separated from the other components of the sample. In one aspect, the complex is captured on surface in the filtration microwell by a reagent capable of binding for capture. In another aspect, the complex is captured on reagent capable of binding the affinity agent for capture to surface of the microwell. In still another aspect, the target analyte is collected while coupled to the affinity agent(s), forming a complex(es). The presence of the affinity agent for capture facilitates the collection of the complexes target analytes. The detection of the target analytes proceeds in accordance with detection methods. In both cases, the collection of the complexes in close proximity to the electrode and reference electrode facilitates the detection electrochemical labels produced. In another embodiment, the content of the cells captured are release by incubating the isolated cells with a reagent capable of releasing biomolecule for passage through the size exclusion filter and a capillary below the size exclusion filter.

The detection methods disclosed herein include incubating a sample suspected of including the target analyte(s) in an analyte detection microwell which includes a size exclusion filter, and incubating the target analyte with affinity agents for a target analyte for capture and detection. This results in complexes wherein target analytes are coupled to with affinity agents for detection and capture of target analytes present in the sample. In one aspect, this results in complexes wherein target analytes are coupled to a binding surface in the microwell. In another aspect, the target analyte is detected while still coupled with affinity agents which enable generation of electrochemical labels in the microwell. In one embodiment, the detection method comprises incubating the sample suspected of including the target analyte(s) with affinity agents and a surface capable of capture of the complex. In another embodiment, the electrochemical detection method comprises incubating the sample suspected of including the target analyte(s) with working electrode, reference electrode, and generated electrochemical labels.

Further preferred and non-limiting embodiments or examples are set forth in the following numbered clauses.

Clause 1: A filtering device for filtering target analytes from non-target components comprises: a first layer including first and second surfaces on opposite sides thereof and a least one hole or opening extending between the first and second surfaces; and a second layer coupled to the second surface of the first layer, the second layer including a size exclusion filter in alignment with the one hole or opening, said size exclusion filter including a plurality of pores in alignment with the one hole or opening.

Clause 2: The filtering device of clause 1, wherein the one hole of opening can have a minimum lateral dimension or diameter >100 μm.

Clause 3: The filtering device of clause 1 or 2, wherein the each pore can have a lateral dimension or diameter >10 μm.

Clause 4: The filtering device of any one of clauses 1-3, wherein each pore can have the shape of an elongated slot.

Clause 5: The filtering device of any one of clauses 1-4, wherein the elongated slot shape of each pore can have an aspect ratio (length/width) >1.5.

Clause 6: The filtering device of any one of clauses 1-5, wherein the elongated slot shape of each pore has a width >1 μm and a length >2 μm; and a total area of the plurality of pores of the size exclusion filter is greater than 20% of an area (e.g., the surface) of the size exclusion filter in alignment with (e.g., that faces) the one hole or opening.

Clause 7: The filtering device of any one of clauses 1-6, wherein the one hole or opening has a minimum lateral dimension of >2 μm.

Clause 8: The filtering device of any one of clauses 1-7, wherein the maximum dimension can be a diameter of the one hole or opening.

Clause 9: The filtering device of any one of clauses 1-8, wherein: the one hole or opening and the size exclusion filter in alignment with the one hole or opening can define a well; and the filtering device can include a binding surface on or in the well.

Clause 10: The filtering device of any one of clauses 1-9, wherein: the hole or opening can have an interior surface coated with a conductive film; and the binding surface can be defined by the conductive film on the interior surface of the hole or opening.

Clause 11: The filtering device of any one of clauses 1-10, wherein the binding surface can be defined by an electrical conductor on a surface of the size exclusion filter that faces the hole or opening.

Clause 12: The filtering device of any one of clauses 1-11, wherein: the binding surface can include or comprise a surface of a particle in the well; and the particle can have a maximum dimension (diameter) greater than a largest dimension of at least one pore of the size exclusion filter.

Clause 13: The filtering device of any one of clauses 1-12 can further include at least one electrode in the well.

Clause 14: The filtering device of any one of clauses 1-13, wherein the at least one electrode in the well can include: an electrical conductor on an interior surface of the hole or opening; an electrical conductor on a surface of the size exclusion filter that faces the hole or opening; or both.

Clause 15: The filtering device of any one of clauses 1-14 can further include at least one electrode outside the well.

Clause 16: The filtering device of any one of clauses 1-15, wherein the at least one electrode outside the well can include: an electrical conductor around the hole or opening on side of the second layer opposite the first layer; an electrical conductor on a surface of the size exclusion filter that faces away from the hole or opening; or both.

Clause 17: The filtering system of any one of clauses 1-16, wherein the first layer can include a plurality of holes or openings extending between the first and second surfaces; and each hole or opening can include a plurality of pores of a or the size exclusion filter in alignment with the hole or opening.

Clause 18: A filtering system comprising: an upper reagent well; a filtering device according to any one of clauses 1-17, wherein an end of the hole or opening of the filtering device opposite the size exclusion filter is in fluid communication with the upper reagent well; and a capillary in fluid communication with a side of the size exclusion filter opposite the upper reagent well.

Clause 19: The filtering system of clause 18 can further include a waste collection vial or chamber coupled to an end of the capillary opposite the size exclusion filter.

Clause 20: The filtering system of clause 18 or 19 can further include a vacuum pump operative for applying a vacuum to the side of the size exclusion filter opposite the upper reagent well.

Further embodiments are described herein. For example, disclosed methods have particular utility for enriching and detecting rare target analytes and rare target cells. Also, provisions are made for amplifying the signal that is detected, which further enhances the ability to detect analytes that are present in relatively low amounts. This is accomplished, for example, by including multiple labels in a single analyte detection particle. In other aspects, the embodiments provide for collection and detection of more than one different target analyte at the same time. The different target analytes may be unrelated, or they may be variations of a target analyte.

Further forms, objects, features, aspects, benefits, advantages, and embodiments of the present invention will become apparent from the detailed description and drawings provided herewith.

DESCRIPTION OF THE INVENTION

Figure 1:
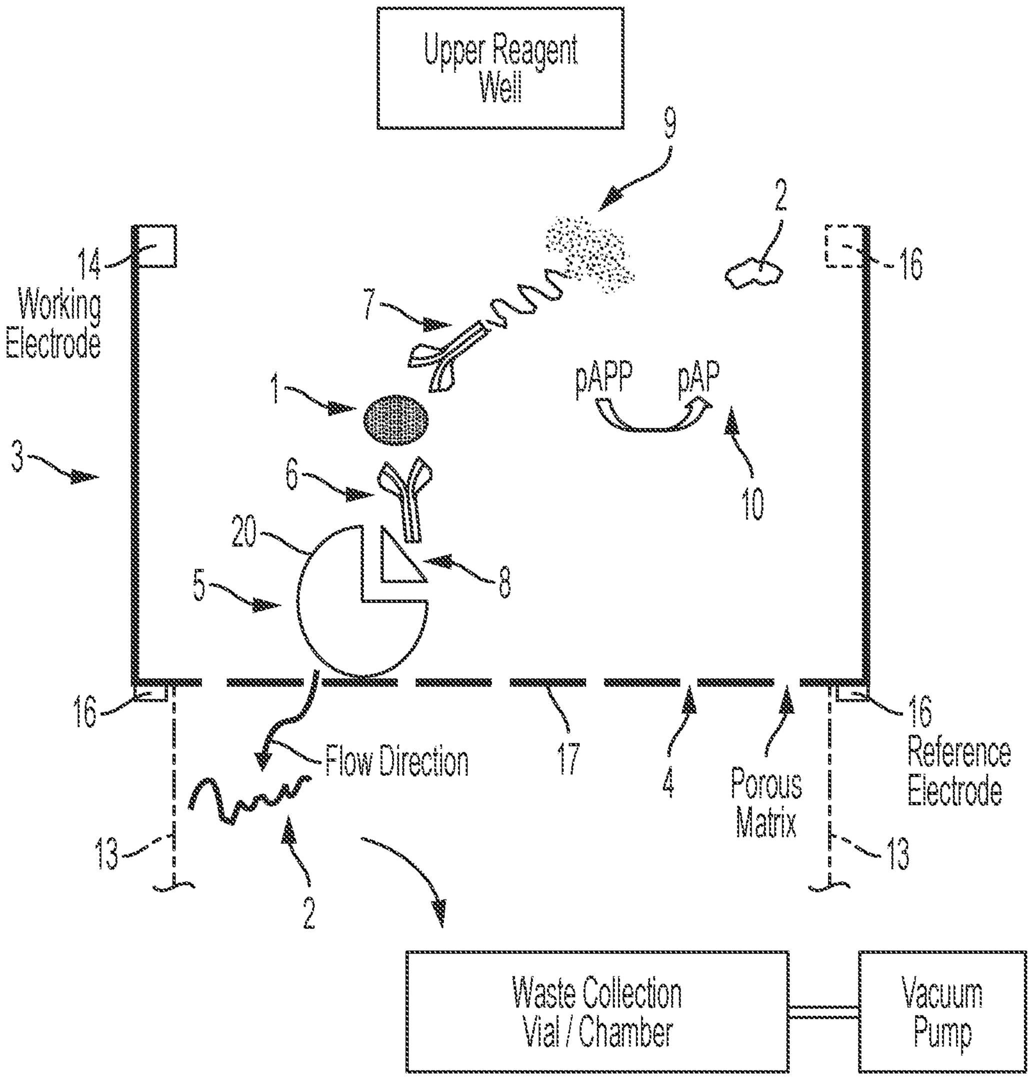
FIG. 1 is schematic drawing, in accordance with the principles of the present invention, showing an example in diagrammatic form the manner in which the analyte complexes are used to collect the target analytes into microwells on to microparticles capable of capture of the complex.

For the purpose of promoting an understanding of the principles of the invention, reference will now be made to the embodiments illustrated in the drawings, wherein like reference numbers correspond to like or functionally equivalent elements, and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Certain embodiments of the invention are shown in detail, but some features that are well known, or that are not relevant to the present invention, may not be shown for the sake of conciseness and clarity.

For purposes of the description hereinafter, the terms "end," "upper," "lower," "right," "left," "vertical," "horizontal," "top," "bottom," "lateral," "longitudinal," "forward," "reverse" and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the invention. Hence, the specific examples or aspects disclosed herein are not to be construed as limiting. Moreover, as used in the specification and the claims, the singular form of terms include plural referents unless the context clearly dictates otherwise.

I. Target Analytes:

The materials and methods described herein are useful with any of a broad variety of target analytes which may be suitably coupled to particles as disclosed herein. The target analytes include a wide range of target molecules and target cells. In addition, the target analytes may comprise one or more target variants, as described hereafter.

Rare molecules are molecules of interest that occur in a sample at a very low concentration. For example, a sample may include rare molecules in the range of 1 to 50,000 copies per μL (femtomolar (fM)) or less. Rare cells are cells that are present in a sample in relatively small quantities compared to the amount of non-rare cells in the sample. For example, rare cells may be present in a sample in an amount of about $10^{-8}$% to about $10^{-2}$% by weight of the total cell population in the sample. These rare molecules and rare cells are collectively referred to as target rare analytes. There are particular advantages of the materials and methods disclosed herein in the ability and accuracy of detecting target rare analytes.

A. Target Molecules:

The term "target molecules" refers generally to molecules of interest that may be detected as analytes in a sample. The target molecules may be contained within or bound to cells, or they may be "cell free molecules" which freely circulate in the sample. Following is an exemplary list of target molecules for which the present materials and methods are useful.

A given test may have a specific target molecule as being of interest. Alternatively, a test may seek to identify at the same time a population of molecules. The population of molecules may include related or unrelated molecules. Related molecules may comprise a group of molecules that share a common portion of molecular structure that specifically defines the group of molecules as being molecules of interest. The common portion distinguishes the group of molecules from other molecules. The related molecules may be target variants, which term refers to a part, piece, fragment or other derivation or modification of a target molecule.

Cell free molecules include biomolecules useful in medical diagnosis and treatment of diseases. Medical diagnosis of diseases includes, but is not limited to, the use of biomarkers for detection of cancer, cardiac damage, cardiovascular disease, neurological disease, hemostasis/hemastasis, fetal maternal assessment, fertility, bone status, hormone levels, vitamins, allergies, autoimmune diseases, hypertension, kidney disease, metabolic disease, diabetes, liver diseases, infectious diseases and other biomolecules useful in medical diagnosis of diseases, for example.

The samples to be analyzed are ones that are suspected of including the target molecules. The samples may be biological samples or non-biological samples. Biological samples may be from a plant, animal, protist or other living organism, including Animalia, fungi, plantae, chromista, or protozoa or other eukaryote species or bacteria, archaea, or other prokaryote species. Non-biological samples include aqueous solutions, environmental, products, chemical reaction production, waste streams, foods, feed stocks, fertilizers, fuels, and the like.

Biological samples include biological fluids such as whole blood, serum, plasma, sputum, lymphatic fluid, semen, cells, exosomes, endosomes, extracellular vesicles, lipids, extracellular matrix, interstitial fluid, mucus, vaginal secretions, nasal secretions, feces, urine, spinal fluid, saliva, stool, cerebral spinal fluid, tears, or tissues for example. Biological tissues include, by way of illustration, hair, skin, or sections or excised tissues from organs or other body parts. For example, the target molecules may be from various tissue sources, including: the lung, bronchus, colon, rectum, extra cellular matrix, dermal, vascular, stem, lead, root, seed, flower, pancreas, prostate, breast, liver, bile duct, bladder, ovary, brain, central nervous system, kidney, pelvis, uterine corpus, oral cavity or pharynx or cancers. In many instances, the sample is aqueous, such as urine, whole blood, plasma or serum samples, while in other instances the sample must be made into a solution or suspension for testing.

Target molecules of metabolic interest further include, but are not limited to, those that impact the concentration of ACC Acetyl Coenzyme A Carboxylase, Adpn Adiponectin, AdipoR Adiponectin Receptor, AG Anhydroglucitol, AGE Advance glycation end products, Akt Protein kinase B, AMBK pre-alpha-1-microglobulin/bikunin, AMPK 5'-AMP activated protein kinase, ASP Acylation stimulating protein, Bik Bikunin, BNP B-type natriuretic peptide, CCL Chemokine (C-C motif) ligand, CINC Cytokine-induced neutrophil chemoattractant, CTF C-Terminal Fragment of Adiponectin Receptor, CRP C-reactive protein, DGAT Acyl CoA diacylglycerol transferase, DPP-IV Dipeptidyl peptidase-IV, EGF Epidermal growth factor, eNOS Endothelial NOS, EPO Erythropoietin, ET Endothelin, Erk Extracellular signal-regulated kinase, FABP Fatty acid-binding protein, FGF Fibroblast growth factor, FFA Free fatty acids, FXR Farnesoid X receptor a, GDF Growth differentiation factor, GH Growth hormone, GIP Glucose-dependent insulinotropic polypeptide, GLP Glucagon-like peptide-1, GSH Glutathione, GHSR Growth hormone secretagogue receptor, GULT Glucose transporters, GCD59 glycated CD59 (aka glyCD59), HbA1c Hemogloblin A1c, HDL High-density lipoprotein, HGF Hepatocyte growth factor, HIF Hypoxia-inducible factor, HMG 3-Hydroxy-3-methylglutaryl CoA reductase, I-α-I Inter-α-inhibitor, Ig-CTF Immunoglobulin attached C-Terminal Fragment of AdipoR, insulin, IDE Insulin-degrading enzyme, IGF Insulin-like growth factor, IGFBP IGF binding proteins, IL Interleukin cytokines, ICAM Intercellular adhesion molecule, JAK STAT Janus kinase/signal transducer and activator of transcription, JNK c-Jun N-terminal kinases, KIM Kidney injury molecule, LCN-2 Lipocalin, LDL Low-density lipoprotein, L-FABP Liver type fatty acid binding protein, LPS Lipopolysaccharide, Lp-PLA2 Lipoprotein-associated phospholipase A2, LXR Liver X receptors, LYVE Endothelial hyaluronan receptor, MAPK Mitogen-activated protein kinase, MCP Monocyte chemotactic protein, MDA Malondialdehyde, MIC Macrophage inhibitory cytokine, MIP Macrophage infammatory protein, MMP Matrix metalloproteinase, MPO Myeloperoxidase, mTOR Mammalian of rapamycin, NADH Nicotinamide adenine di-nucleotide, NGF Nerve growth factor, NFκB Nuclear factor kappa-light-chain-enhancer of activated B cells, NGAL Neutrophil gelatinase lipocalin, NOS Nitric oxide synthase NOX NADH oxidase NPY Neuropeptide Yglucose, insulin, proinsulin, c peptide OHdG Hydroxy-deoxyguanosine, oxLDL Oxidized low density lipoprotein, P-α-I pre-interleukin-α-inhibitor, PAI-1 Plasminogen activator inhibitor, PAR Protease-activated receptors, PDF Placental growth factor, PDGF Platelet-derived growth factor, PKA Protein kinase A, PKC Protein kinase C, PI3K Phosphatidylinositol 3-kinase, PLA2 Phosphatidylinositol 3-kinase, PLC Phospholipase C, PPAR Peroxisome proliferator-activated receptor, PPG Postprandial glucose, PS Phosphatidyl-serine, PR Protienase, PYY Neuropeptide like peptide Y, RAGE Receptors for AGE, ROS Reactive oxygen species, S100 Calgranulin, sCr Serum creatinine, SGLT2 Sodium-glucose transporter 2, SFRP4 secreted frizzled-related protein 4 precursor, SREBP Sterol regulatory element binding proteins, SMAD Sterile alpha motif domain-containing protein, SOD Superoxide dismutase, sTNFR Soluble TNF α receptor, TACE TNFα alpha cleavage protease, TFPI Tissue factor pathway inhibitor, TG Triglycerides, TGF β Transforming growth factor-β, TIMP Tissue inhibitor of metalloproteinases, TNF α Tumor necrosis factors-α, TNFR TNF α receptor, THP Tamm-Horsfall protein, TLR Toll-like receptors, TnI Troponin I, tPA Tissue plasminogen activator, TSP Thrombospondin, Uri Uristatin, uTi Urinary trypsin inhibitor, uPA Urokinase-type plasminogen activator, uPAR uPA receptor, VCAM Vascular cell adhesion molecule, VEGF Vascular endothelial growth factor, and YKL-40 Chitinase-3-like protein.

Target molecules of interest that are highly expressed by pancreatic tissue or found in the pancreas include insulin, proinsulin, c-peptide, PNLIPRP1 pancreatic lipase-related protein 1, SYCN syncollin, PRSS1 protease, serine, 1 (trypsin 1) Intracellular, CTRB2 chymotrypsinogen B2 Intracellular, CELA2A chymotrypsin-like elastase family, member 2A, CTRB1 chymo-trypsinogen B1 Intracellular, CELA3A chymotrypsin-like elastase family, member 3A Intracellular, CELA3B chymotrypsin-like elastase family, member 3B Intracellular, CTRC chymo-trypsin C (caldecrin), CPA1 carboxypeptidase A1 (pancreatic) Intracellular, PNLIP pancreatic lipase, and CPB1 carboxypeptidase B1 (tissue), AMY2A amylase, alpha 2A (pancreatic), PDX1 insulin promoter factor 1, MAFA Maf family of transcription factors, GLUT2 Glucose Transporter Type 2, ST8SIA1 Alpha-N-acetylneuraminide alpha-2,8-sialyltransferase, CD9 tetraspanin, ALDH1A3 aldehyde dehydrogenase, CTFR cystic fibrosis transmembrane conductance regulator as well as diabetic auto immune antibodies such as against GAD, IA-2, IAA, ZnT8 or the like.

Some specific examples of therapeutic proteins and peptides include glucagon, ghrelin, leptin, growth hormone, prolactin, human placental, lactogen, luteinizing hormone, follicle stimulating hormone, chorionic gonadotropin, thyroid stimulating hormone, adrenocorticotropic hormone, vasopressin, oxytocin, angiotensin, parathyroid hormone, gastrin, buserelin, antihemophilic factor, pancrelipase, insulin, insulin aspart, porcine insulin, insulin lispro, insulin isophane, insulin glulisine, insulin detemir, insulin glargine, immunglobulins, interferon, leuprolide, denileukin, asparaginase, thyrotropin, alpha-1-proteinase inhibitor, exenatide, albumin, coagulation factors, alglucosidase alfa, salmon calcitonin, vasopressin, dpidermal growth factor (EGF), cholecystokinin (CCK-8), vacines, human growth hormone and others. Some new examples of therapeutic proteins and peptides include GLP-1-GCG, GLP-1-GIP, GLP-1, GLP-1-GLP-2, and GLP-1-CCKB'.

Target molecules of interest that are highly expressed by adipose tissue include, but are not limited to, ADIPOQ Adiponectin, C1Q and collagen domain containing, TUSC5 Tumor suppressor candidate 5, LEP Leptin, CIDEA Cell death-inducing DFFA-like effector a, CIDEC Cell death-inducing DFFA-like effector C, FABP4 Fatty acid binding protein 4, adipocyte, LIPE, GYG2, PLIN1 Perilipin 1, PLIN4 Perilipin 4, CSN1S1, PNPLA2, RP11-407P15.2 Protein LOC100509620, L GALS12 Lectin, galactoside-binding, soluble 12, GPAM Glycerol-3-phosphate acyltransferase, mitochondrial, PR325317.1 predicted protein, ACACB Acetyl-CoA carboxylase beta, ACVR1C Activin A receptor, type IC, AQP7 Aquaporin 7, CFD Complement factor D (adipsin)m CSN1S1Casein alpha s1, FASN Fatty acid synthase GYG2 Glycogenin 2 KIF25Kinesin family member 25 LIPELipase, hormone-sensitive PNPLA2 Patatin-like phospholipase domain containing 2 SLC29A4 Solute label family 29 (equilibrative nucleoside transporter), member 4 SLC7A10 Solute label family 7 (neutral amino acid transporter light chain, asc system), member 10, SPX Spexin hormone and TIMP4 TIMP metallopeptidase inhibitor 4.

Target molecules of interest that are highly expressed by the adrenal gland and thyroid include, but are not limited to, CYP11B2 Cytochrome P450, family 11, subfamily B, polypeptide 2, CYP11B1 Cytochrome P450, family 11, subfamily B, polypeptide 1, CYP17A1 Cytochrome P450, family 17, subfamily A, polypeptide 1, MC2R Melanocortin 2 receptor (adreno-corticotropic hormone), CYP21A2 Cytochrome P450, family 21, subfamily A, polypeptide 2, HSD3B2 Hydroxy-delta-5-steroid dehydrogenase, 3 beta- and steroid delta-isomerase 2, TH Tyrosine hydroxylase, AS3MT Arsenite methyltransferase, CYP11A1 Cytochrome P450, family 11, subfamily A, polypeptide 1, DBH Dopamine beta-hydroxylase (dopamine betamono-oxygenase), HSD3B2 Hydroxy-delta-5-steroid dehydrogenase, 3 beta- and steroid delta-isomerase 2, TH Tyrosine hydroxylase, AS3MT Arsenite methyltransferase, CYP11A1 Cytochrome P450, family 11, subfamily A, polypeptide 1, DBH Dopamine beta-hydroxylase (dopamine beta-monooxygenase), AKR1B1 Aldo-keto reductase family 1, member B1 (aldose reductase), NOV Nephroblastoma overexpressed, FDX1 Ferredoxin 1, DGKK Diacylglycerol kinase, kappa, MGARP Mitochondria-localized glutamic acid-rich protein, VWA5B2 Von Willebrand factor A domain containing 5B2, C18orf42 Chromosome 18 open reading frame 42, KIAA1024, MAP3K15 Mitogen-activated protein kinase kinase kinase 15, STAR Steroidogenic acute regulatory protein Potassium channel, subfamily K, member 2, NOV nephroblastoma overexpressed, PNMT phenylethanolamine N-methyltransferase, CHGB chromogranin B (secretogranin 1), and PHOX2A paired-like homeobox 2a.

Target molecules of interest that are highly expressed by bone marrow include, but are not limited, to DEFA4 defensin alpha 4 corticostatin, PRTN3 proteinase 3, AZU1 azurocidin 1, DEFA1 defensin alpha 1, ELANE elastase, neutrophil expressed, DEFA1B defensin alpha 1B, DEFA3 defensin alpha 3 neutrophil-specific, mass spectroscopy4A3 membrane-spanning 4-domains, subfamily A, member 3 (hematopoietic cell-specific), RNASE3 ribonuclease RNase A family 3, MPO myeloperoxidase, HBD hemoglobin, delta, and PRSS57 protease, serine 57.

Target molecules of interest that are highly expressed by the brain include, but are not limited to, GFAP glial fibrillary acidic protein, OPALIN oligodendrocytic myelin paranodal and inner loop protein, OLIG2 oligodendrocyte lineage transcription factor 2, GRIN1glutamate receptor ionotropic, N-methyl D-aspartate 1, OMG oligodendrocyte myelin glycoprotein, SLC17A7 solute label family 17 (vesicular glutamate transporter), member 7, C1orf61 chromosome 1 open reading frame 61, CREG2 cellular repressor of E1A-stimulated genes 2, NEUROD6 neuronal differentiation 6, ZDHHC22 zinc finger DHHC-type containing 22, VSTM2B V-set and transmembrane domain containing 2B, and PMP2 peripheral myelin protein 2.

Target molecules of interest that are highly expressed by the endometrium, ovary, or placenta include, but are not limited to, MMP26 matrix metallopeptidase 26, MMP10 matrix metallopeptidase 10 (stromelysin 2), RP4-559A3.7 uncharacterized protein and TRH thyrotropin-releasing hormone. Rare molecules of interest that are highly expressed by the gastrointestinal tract, salivary gland, esophagus, stomach, duodenum, small intestine, or colon include, but are not limited to, GKN1 Gastrokine 1, GIF Gastric intrinsic factor (vitamin B synthesis), PGA5 Pepsinogen 5 group I (pepsinogen A), PGA3 Pepsinogen 3, group I (pepsinogen A, PGA4 Pepsinogen 4 group I (pepsinogen A), LCT Lactase, DEFA5 Defensin, alpha 5 Paneth cell-specific, CCL25 Chemokine (C-C motif) ligand 25, DEFA6 Defensin alpha 6 Paneth cell-specific, GAST Gastrin, mass spectroscopy4A10 Membrane-spanning 4-domains subfamily A member 10, ATP4A and ATPase, H+/K+ exchanging alpha polypeptide.

Target molecules of interest that are highly expressed by the heart or skeletal muscles include, but are not limited to, NPPB natriuretic peptide B, TNNI3 troponin I type 3 (cardiac), NPPA natriuretic peptide A, MYL7 myosin light chain 7 regulatory, MYBPC3 myosin binding protein C (cardiac), TNNT2 troponin T type 2 (cardiac) LRRC10 leucine rich repeat containing 10, ANKRD1 ankyrin repeat domain 1 (cardiac muscle), RD3L retinal degeneration 3-like, BMP10 bone morphogenetic protein 10, CHRNE cholinergic receptor nicotinic epsilon (muscle), and SBK2 SH3 domain binding kinase family member 2.

Target molecules of interest that are highly expressed by the kidney include, but are not limited to, UMOD uromodulin, TMEM174 transmembrane protein 174, SLC22A8 solute label family 22 (organic anion transporter) member 8, SLC12A1 solute label family 12 (sodium/potassium/chloride transporter) member 1, SLC34A1 solute label family 34 (type II sodium/phosphate transporter) member 1, SLC22A12 solute label family 22 (organic anion/urate transporter) member 12, SLC22A2 solute label family 22 (organic cation transporter) member 2, MCCD1 mitochondrial coiled-coil domain 1, AQP2 aquaporin 2 (collecting duct), SLC7A13 solute label family 7 (anionic amino acid transporter) member 13, KCNJ1 potassium inwardly-rectifying channel, subfamily J member 1 and SLC22A6 solute label family 22 (organic anion transporter) member 6.

Target molecules of interest that are highly expressed by the lung include, but are not limited to, SFTPC surfactant protein C, SFTPA1 surfactant protein A1, SFTPB surfactant protein B, SFTPA2 surfactant protein A2, AGER advanced glycosylation end product-specific receptor, SCGB3A2 secretoglobin family 3A member 2, SFTPD surfactant protein D, ROS1 proto-oncogene 1 receptor tyrosine kinase, mass spectroscopy4A15 membrane-spanning 4-domains subfamily A member 15, RTKN2 rhotekin 2, NAPSA napsin A aspartic peptidase, and LRRN4 leucine rich repeat neuronal 4.

Target molecules of interest that are highly expressed by liver or gallbladder include, but are not limited to, APOA2 apolipoprotein A-II, A1BG alpha-1-B glycoprotein, AHSG alpha-2-HS-glycoprotein, F2 coagulation factor II (thrombin), CFHR2 complement factor H-related 2, HPX hemopexin, F9 coagulation factor IX, CFHR2 complement factor H-related 2, SPP2 secreted phosphoprotein 2 (24 kDa), C9 complement component 9, MBL2 mannose-binding lectin (protein C) 2 soluble and CYP2A6 cytochrome P450 family 2 subfamily A polypeptide 6. Rare molecules of interest that are highly expressed by testis or prostate include, but are not limited to, PRM2 protamine 2 PRM1 protamine 1 TNP1 transition protein 1 (during histone to protamine replacement), TUBA3C tubulin, alpha 3c LELP1late cornified envelope-like proline-rich 1 BOD1L2 biorientation of chromosomes in cell division 1-like 2 ANKRD7 ankyrin repeat domain 7 PGK2 phosphoglycerate kinase 2 AKAP4 A kinase (PRKA) anchor protein 4 TPD52L3 tumor protein D52-like 3 UBQLN3 ubiquilin 3 and ACTL7A actin-like 7A.

B. Target Variants:

In addition to testing for a particular target molecule, a test may also detect target variants which can instead, and/or in addition, be detected as a means for detecting the target molecule(s). The relevant variations of a target molecule constitute target variants. These target variants may be present naturally in the sample, or they may be intentionally produced. One or more target variants may be indicative of a particular population of target molecules. Target variants may be generated from parts and pieces of cells and tissues, as well as from small molecules. Binding and association reactions also lead to additional differences in target variants by generating bound forms which are variations that differ from unbound forms.

Target variants may comprise molecules of biological or non-biological origin, including small molecules such as metabolites, co-factors, substrates, amino acids, metals, vitamins, fatty acids, biomolecules, peptides, carbohydrates or others. Target variants may also include macromolecules, such as glycoconjugates, lipids, nucleic acids, polypeptides, receptors, enzymes and proteins, as well as cells and tissues including cellular structures, peroxisomes, endoplasmic reticulum, endosomes, exosomes, lysosomes, mitochondria, cytoskeleton, membranes, nucleus, extra cellular matrix or other molecules typically measured.

Target variants can be used to measure enzymes, proteases, peptidase, proteins and inhibitors acting to form the target variants. The target variants may be formed naturally, or may be man-made, such as biologicals, therapeutics or others. These target variants can result intentionally from fragmentation, additions, binding or other modifications of the analyte. Some examples in accordance with the principles described herein are directed to the addition of peptidases, enzymes, inhibitors or other reagents prior to the method of isolation such that variations of analyte are formed. These target variants can be the result of intentional affinity reactions to isolate target variants prior to analysis with the method.

In accordance with the principles described, target variants can be derived from a molecule of biological or non-biological origin. The target variants include but are not limited to biomolecules such as carbohydrates, lipids, nucleic acids, peptides and proteins. Target variants can be the result of reactions, biological processes, disease, or intentional reactions and can be used to measure diseases or natural states. Target variants can also result from changes in molecules, such as proteins, enzymes, biologics or peptides, of man-made or natural origin, and include bioactive and non-bioactive molecules such as those used in medical devices, therapeutic use, diagnostic use, used for measurement of processes, and those used as food, in agriculture, in production, as pro- or pre-biotics, in micro-organisms or cellular production, as chemicals for processes, for growth, measurement or control of cells, used for food safety and environmental assessment, used in veterinary products, and used in cosmetics. Target variants can be fragments of larger portions or bound forms and can be used to measure other molecules, such as enzymes, peptidase and others. The measurements of other molecules, such as enzymes, peptidase and others can be based on formation of target variants, such as enzymatic or proteolytic products. The measurements of other molecules, such as natural inhibitors, synthetic inhibitors and others, can be based on the lack of formation of target variants.

C. Examples of Target Variants:

Target molecule fragments that can be used to measure peptidases of interest include those in the MEROPS, which is an on-line database for peptidases (also known as proteases) and identifies ~902,212 different sequences of aspartic, cysteine, glutamic, metallo, asparagine, serine, threonine and general peptidases catalytics types which are further categorized and include those listed for the following pathways: 2-Oxocarboxylic acid metabolism, ABC transporters, African trypanosomiasis, alanine, aspartate and glutamate metabolism, allograft rejection, Alzheimer's disease, amino sugar and nucleotide sugar metabolism, amoebiasis, AMPK signaling pathway, amyotrophic lateral sclerosis (ALS), antigen processing and presentation, apoptosis, arachidonic acid metabolism, arginine and proline metabolism, arrhythmogenic right ventricular cardiomyopathy (ARVC), asthma, autoimmune thyroid disease, B cell receptor signaling pathway, bacterial secretion system, basal transcription factors, beta-alanine metabolism, bile secretion, biosynthesis of amino acids, biosynthesis of secondary metabolites, biosynthesis of unsaturated fatty acids, biotin metabolism, bisphenol degradation, bladder cancer, cAMP signaling pathway, carbon metabolism, cardiac muscle contraction, cell adhesion molecules (CAMs), cell cycle, cell cycle—yeast, chagas disease (American trypanosomiasis), chemical carcinogenesis, cholinergic synapse, colorectal cancer, complement and coagulation cascades, cyanoamino acid metabolism, cysteine and methionine metabolism, cytokine-cytokine receptor interaction, cytosolic DNA-sensing pathway, degradation of aromatic compounds, dilated cardiomyopathy, dioxin degradation, DNA replication, dorso-ventral axis formation, drug metabolism—other enzymes, endocrine and other factor-regulated calcium reabsorption, endocytosis, epithelial cell signaling in *Helicobacter pylori* infection, Epstein-Barr virus infection, estrogen signaling pathway, Fanconi anemia pathway, fatty acid elongation, focal adhesion, folate biosynthesis, foxO signaling pathway, glutathione metabolism, glycerolipid metabolism, glycerophospholipid metabolism, glycosylphosphatidylinositol (GPI)-anchor bio-synthesis, glyoxylate and dicarboxylate metabolism, GnRH signaling pathway, graft-versus-host disease, hedgehog signaling pathway, hematopoietic cell lineage, hepatitis B, herpes simplex infection, HIF-1 signaling pathway, hippo signaling pathway, histidine metabolism, homologous recombination, HTLV-I infection, huntington's disease, hypertrophic cardiomyopathy (HCM), influenza A, insulin signaling pathway, legionellosis, Leishmaniasis, leukocyte transendothelial migration, lysine biosynthesis, lysosome, malaria, MAPK signaling pathway, meiosis—yeast, melanoma, metabolic pathways, metabolism of xenobiotics by cytochrome P450, microbial metabolism in diverse environments, microRNAs in cancer, mineral absorption, mismatch repair, natural killer cell mediated cytotoxicity, neuroactive ligand-receptor interaction, NF-kappa B signaling pathway, nitrogen metabolism, NOD-like receptor signaling pathway, non-alcoholic fatty liver disease (NAFLD), notch signaling pathway, olfactory transduction, oocyte meiosis, osteoclast differentiation, other glycan degradation, ovarian steroidogenesis, oxidative phosphorylation, p53 signaling pathway, pancreatic secretion, pantothenate and CoA biosynthesis, Parkinson's disease, pathways in cancer, penicillin and cephalosporin biosynthesis, peptidoglycan biosynthesis, peroxisome, pertussis, phagosome, phenylalanine metabolism, phenylalanine, tyrosine and tryptophan biosynthesis, phenylpropanoid biosynthesis, PI3K-Akt signaling pathway, plant-pathogen interaction, platelet activation, PPAR signaling pathway, prion diseases, proteasome, protein digestion and absorption, protein export, protein processing in endoplasmic reticulum, proteoglycans in cancer, purine metabolism, pyrimidine metabolism, pyruvate metabolism, Rap1 signaling pathway, Ras signaling pathway, regulation of actin cyto-skeleton, regulation of autophagy, renal cell carcinoma, renin-angiotensin system, retrograde endocannabinoid signaling, rheumatoid arthritis, RIG-I-like receptor signalling pathway, RNA degradation, RNA transport, salivary secretion, salmonella infection, serotonergic synapse, small cell lung cancer, spliceosome, *Staphylococcus aureus* infection, systemic lupus erythematosus, T cell receptor signaling pathway, taurine and hypotaurine metabolism, terpenoid backbone bio-synthesis, TGF-beta signaling pathway, TNF signaling pathway, Toll-like receptor signaling pathway, toxoplasmosis, transcriptional misregulation in cancer, tryptophan metabolism, tuberculosis, two-component system, type I diabetes mellitus, ubiquinone and other terpenoid-quinone biosynthesis, ubiquitin mediated proteolysis, vancomycin resistance, viral carcino-genesis, viral myocarditis, vitamin digestion, and absorption Wnt signaling pathway.

Target molecule fragments that can be used to measure peptidase inhibitors of interest include those in the MEROPS (an on-line database for peptidase inhibitors) which includes a total of ~133,535 different sequences, where a family is a set of homologous peptidase inhibitors with a homology. The homology is shown by a significant similarity in amino acid sequence either to the type inhibitor of the family, or to another protein that has already been shown to be homologous to the type inhibitor. The reference organism for the family is shown ovomucoid inhibitor unit 3 (*Meleagris gallopavo*)aprotinin (*Bos taurus*), soybean Kunitz trypsin inhibitor (*Glycine max*), proteinase inhibitor B (*Sagittaria sagittifolia*), alpha-1-peptidase inhibitor (*Homo sapiens*), ascidian trypsin inhibitor (*Halocynthia roretzi*), ragi seed trypsin/alpha-amylase inhibitor (*Eleusine coracana*), trypsin inhibitor MCTI-1 (*Momordica charantia*), Bombyx subtilisin inhibitor (*Bombyx mori*), peptidase B inhibitor (*Saccharomyces cerevisiae*), marinostatin (*Alteromonas* sp.), ecotin (*Escherichia coli*), Bowman-Birk inhibitor unit 1 (Glycine max), eglin c (*Hirudo medicinalis*), hirudin (*Hirudo medicinalis*), antistasin inhibitor unit 1 (*Haementeria officinalis*), streptomyces subtilisin inhibitor (*Streptomyces albogriseolus*), secretory leukocyte peptidase inhibitor domain 2 (*Homo sapiens*), mustard trypsin inhibitor-2 (*Sinapis alba*), peptidase inhibitor LMPI inhibitor unit 1 (*Locusta migratoria*), potato peptidase inhibitor II inhibitor unit 1 (*Solanum tuberosum*), secretogranin V (*Homo sapiens*), BsuPI peptidase inhibitor (*Bacillus subtilis*), pinA Lon peptidase inhibitor (*Enterobacteria* phage T4), cystatin A (*Homo sapiens*), ovocystatin (*Gallus gallus*), metallopeptidase inhibitor (*Bothrops jararaca*), calpastatin inhibitor unit 1 (*Homo sapiens*), cytotoxic T-lymphocyte antigen-2 alpha (*Mus musculus*), equistatin inhibitor unit 1 (*Actinia equina*), survivin (*Homo sapiens*), aspin (*Ascaris suum*), saccharopepsin inhibitor (*Saccharomyces cerevisiae*), timp-1 (*Homo sapiens*), Streptomyces metallopeptidase inhibitor (*Streptomyces nigrescens*), potato metallocarboxypeptidase inhibitor (*Solanum tuberosum*), metallopeptidase inhibitor (*Dickeya chrysanthemi*), alpha-2-macroglobulin (*Homo sapiens*), chagasin (*Leishmania major*), oprin (*Didelphis marsupialis*), metallocarboxypeptidase A inhibitor (*Ascaris suum*), leech metallocarboxypeptidase inhibitor (*Hirudo medicinalis*), latexin (*Homo sapiens*), clitocypin (*Lepista nebularis*), proSAAS (*Homo sapiens*), baculovirus P35 caspase inhibitor (*Spodoptera litura nucleopolyhedrovirus*), p35 homologue (*Amsacta moorei entomopoxvirus*), serine carboxypeptidase Y inhibitor (*Saccharomyces cerevisiae*), tick anticoagulant peptide (*Ornithodoros moubata*), madanin 1 (*Haemaphysalis longicornis*), squash aspartic peptidase inhibitor (*Cucumis sativus*), staphostatin B (*Staphylococcus aureus*), staphostatin A (*Staphylococcus aureus*), triabin (*Triatoma pallidipennis*), pro-eosinophil major basic protein (*Homo sapiens*), thrombostasin (*Haematobia irritans*), Lentinus peptidase inhibitor (*Lentinula edodes*), bromein (*Ananas comosus*), tick carboxypeptidase inhibitor (*Rhipicephalus bursa*), streptopain inhibitor (*Streptococcus pyogenes*), falstatin (*Plasmodium falciparum*), chimadanin (*Haemaphysalis longicornis*), {Veronica} trypsin inhibitor (*Veronica hederifolia*), variegin (*Amblyomma variegatum*), bacteriophage lambda CIII protein (*bacteriophage lambda*), thrombin inhibitor (*Glossina morsitans*), anophelin (*Anopheles albimanus*), *Aspergillus* elastase inhibitor (*Aspergillus fumigatus*), AVR2 protein (*Passalora fulva*), IseA protein (*Bacillus subtilis*), toxostatin-1 (*Toxoplasma gondii*), AmFPI-1 (*Antheraea mylitta*), cvSl-2 (*Crassostrea virginica*), macrocypin 1 (*Macrolepiota procera*), HflC (*Escherichia coli*), oryctin (*Oryctes rhinoceros*), trypsin inhibitor (*Mirabilis jalapa*), F1L protein (*Vaccinia virus*), NvCI carboxypeptidase inhibitor (*Nerita versicolor*), Sizzled protein (*Xenopus laevis*), EAPH2 protein (*Staphylococcus aureus*), and Bowman-Birk-like trypsin inhibitor (*Odorrana versabilis*). Rare molecule fragments can be used to measure synthetic inhibition of peptidase inhibitors. The aforementioned database also includes examples of thousands of different small molecule inhibitors that can mimic the inhibitory properties for any member of the above listed families.

Target molecule fragments include those of insulin, proinsulin or c peptide generated by the following peptidases known to naturally act on insulin: archaelysin, duodenase, calpain-1, ammodytase subfamily M12B peptidases, ALE1 peptidase, CDF peptidase, cathepsin E, meprin alpha subunit, jerdohagin (*Trimeresurus jerdonii*), carboxypeptidase E, dibasic processing endopeptidase, yapsin-1, yapsin A, PCSK1 peptidase, aminopeptidase B, PCSK1 peptidase, PCSK2 peptidase, insulysin, matrix metallopeptidase-9 and others. These fragments include but are not limited to the following sequences: SEQ ID NO:1 MALWMRLLPLLALLALWGP, SEQ ID NO:2 MALWMRLLPL, SEQ ID NO:3 ALLALWGPD, SEQ ID NO:4 AAAFVNQHLCGSHLVEALYLVCGERGFFYTPKTR, SEQ ID NO:5 PAAAFVNQHLCGSHLVEALYLVC, SEQ ID NO:6

PAAAFVNQHLCGS, SEQ ID NO:7 CGSHLVEALYLV, SEQ ID NO:8 VEALYLVC, SEQ ID NO:9 LVCGERGF, SEQ ID NO:10 FFYTPK, SEQ ID NO:11 REAEDLQVGQVELGGGPGAGSLQPLALEGSL, SEQ ID NO:12 REAEDLQVGQVE, SEQ ID NO:13 LGGGPGAG, SEQ ID NO:14 SLQPLALEGSL, SEQ ID NO:15 GIVEQCCTSICSLYQLENYCN, SEQ ID NO:16 GIVEQCCTSICSLY, SEQ ID NO:17 QLENYCN, and SEQ ID NO:18 CSLYQLE, and variations within 75% of exact homology. Variations include natural and modified amino acids.

Target molecule fragments of insulin can be used to measure the peptidases acting on insulin based on formation of fragments. This includes the list of natural known peptidases and others added to the biological system. Additional rare molecule fragments of insulin can be used to measure inhibitors for peptidases acting on insulin based on the lack formation of fragments. These inhibitors include the c-terminal fragment of the Adiponectin Receptor, Bikunin, Uristatin and other known natural and synthetic inhibitors of archaelysin, duodenase, calpain-1, ammodytase subfamily M12B peptidases, ALE1 peptidase, CDF peptidase, cathepsin E, meprin alpha subunit, jerdohagin (*Trimeresurus jerdonii*), carboxypeptidase E, dibasic processing endopeptidase, yapsin-1, yapsin A, PCSK1 peptidase, aminopeptidase B, PCSK1 peptidase, PCSK2 peptidase, insulysin, and matrix metallopeptidase-9 listed in the inhibitor databases.

Target molecule fragments of bioactive therapeutic proteins and peptides can be used to measure the presence or absence thereof as an indication of therapeutic effectiveness, stability, usage, metabolism, action on biological pathways (such as actions with proteases, peptidase, enzymes, receptors or other biomolecules), action of inhibition of pathways and other interactions with biological systems. Examples include, but are not limited to, those listed in databases of approved therapeutic peptides and proteins, such as http://crdd.osdd.net/, as well as other databases of peptides and proteins for dietary supplements, probiotics, food safety, veterinary products, and cosmetics usage. The list of the approved peptide and protein therapies includes examples of bioactive proteins and peptides for use in cancer, metabolic disorders, hematological disorders, immunological disorders, genetic disorders, hormonal disorders, bone disorders, cardiac disorders, infectious disease, respiratory disorders, neurological disorders, adjunct therapy, eye disorders, and malabsorption disorder. Bioactive proteins and peptides include those used as anti-thrombins, fibrinolytic, enzymes, antineoplastic agents, hormones, fertility agents, immunosupressive agents, bone related agents, antidiabetic agents, and antibodies D. Formation of Target Variants:

The target variants can be as a result of translation, or posttranslational modification by enzymatic or non-enzymatic modifications. Post-translational modification refers to the covalent modification of proteins during or after protein biosynthesis. Post-translational modification can be through enzymatic or non-enzymatic chemical reaction. Phosphorylation is a common mechanism for regulating the activity of enzymes and is the most common post-translational modification. Enzymes can be oxidoreductases, hydrolases, lyases, isomerases, ligases or transferases as known commonly in enzyme taxonomy databases, such as http://enzyme.expasy.org/ or http://www.enzyme-database.org/, which have more than 6000 entries.

Common modifications of target variants include the addition of hydrophobic groups for membrane localization, addition of cofactors for enhanced enzymatic activity, diphthamide formation, hypusine formation, ethanolamine phosphoglycerol attachment, acylation, alkylation, amide bond formation such as amino acid addition or amidation, butyrylation gamma-carboxylation dependent on Vitamin K[15], glycosylation, the addition of a glycosyl group to either arginine, asparagine, cysteine, hydroxylysine, serine, threonine, tyrosine, or tryptophan resulting in a glycoprotein, malonylationhydroxylation, iodination, nucleotide addition such as ADP-ribosylation, phosphate ester (O-linked) or phosphoramidate (N-linked) formation such as phosphorylation or adenylylation, propionylation pyroglutamate formation, S-glutathionylation, S-nitrosylation S-sulfenylation (aka S-sulphenylation), succinylation or sulfation. Non-enzymatic modification include the attachment of sugars, carbamylation, carbonylation or intentional recombinate or synthetic conjugation such as biotinylation or addition of affinity agents, such as histidine oxidation, formation of disulfide bonds between cystine residues, or pegylation (addition of polyethylene oxide groups).

Common reagents for intentional fragmentation and formation of target variants such as peptides and proteins include peptidases or reagents know to react with peptides and proteins. The terms "polypeptide," "peptide" and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer.

Intentional fragmentation can generate specific fragments based on predicted cleavage sites for proteases (also termed peptidases or proteinases) and chemicals known to react with peptide and protein sequences. Common peptidases and chemicals for intentional fragmentation include Arg-C, Asp-N, BNPS oNCS/urea, caspase, chymotrypsin (low specificity), Clostripain, CNBr, enterokinase, factor Xa, formic acid, Glu-C, granzyme B, HRV3C protease, hydroxylamine, iodobenzoic acid, Lys-C, Lys-N, mild acid hydrolysis, NBS, NTCB, elastase, pepsin A, prolyl endopeptidase, proteinase K, TEV protease, thermolysin, thrombin, and trypsin.

Common reagents for intentional inhibition of fragmentation include enzymes, peptidases, proteases, reductants, oxidants, chemical reactants, and chemical inhibitors for enzymes, peptidases, proteases including chemicals above listed.

E. Target Cells:

The target analytes may also comprise target cells. Target cells may include natural and synthetic cells. The cells may be found in biological samples that are suspected of including the target cells, including both rare and non-rare cells. The samples may be biological samples or non-biological samples. Biological samples may be from a mammalian subject or a non-mammalian subject. Mammalian subjects may be humans or other animal species.

The disclosed materials and methods are useful with a wide variety of target cells and cell components. The target cells may comprise a population of cells, for example, a group of cells having an antigen or nucleic acid on their surface or inside the cell where the antigen is common to all of the cells of the group and where the antigen is specific for the group of cells. The term target cells also broadly encompasses cell components, such as biomarkers, which may be detected as analytes.

The target analytes may also comprise "target cellular molecules", which refers to molecules that are contained in or bound to a cell, and which may or may not freely circulate in a sample. Such cellular molecules include biomolecules useful in medical diagnosis of diseases as above, and also include all molecules and uses previously described with respect to cell free molecules. The target cells may be, but are not limited to, malignant cells such as malignant neoplasms or cancer cells; circulating cells; endothelial cells (CD146); epithelial cells (CD326/EpCAM); mesochymal cells (VIM), bacterial cells, virus, skin cells, sex cells, fetal cells; immune cells (leukocytes such as basophil, granulocytes (CD66b) and eosinophil, lymphocytes such as B cells (CD19,CD20), T cells (CD3,CD4 CD8), plasma cells, and NK cells (CD56), macrophages/monocytes (CD14, CD33), dendritic cells (CD11c, CD123), Treg cells (and others), stem cells/precursor (CD34), other blood cells such as progenitor, blast, erythrocytes, thrombocytes, platelets (CD41, CD61, CD62) and immature cells; other cells from tissues such as liver, brain, pancreas, muscle, fat, lung, prostate, kidney, urinary tract, adipose, bone marrow, endometrium, gastrointestinal tract, heart, testis or other, for example.

As noted previously, the disclosed materials and methods may have particular advantage in the detection, isolation and/or analysis of target rare cells. By comparison, non-rare cells are those cells that are present in relatively large amounts when compared to the amount of rare cells in a sample. In some non-limiting embodiments or examples, the non-rare cells are at least about 10 times, or at least about $10^2$ times, or at least about $10^3$ times, or at least about $10^4$ times, or at least about $10^5$ times, or at least about $10^6$ times, or at least about $10^7$ times, or at least about $10^8$ times greater than the amount of the rare cells in the total cell population in a sample suspected of including non-rare cells and rare cells. The non-rare cells may be, but are not limited to, white blood cells, platelets, and/or red blood cells, for example.

The term "rare cell marker" includes, but is not limited to, cancer cell type biomarkers, cancer bio markers, chemo resistance biomarkers, metastatic potential biomarkers, and cell typing markers. A cluster of differentiation (cluster of designation or classification determinant, often abbreviated as CD) is a protocol used for the identification and investigation of cell surface molecules providing targets for immunophenotyping of cells. Cancer cell type biomarkers include, by way of illustration and not limitation, cytokeratins (CK) (CK1, CK2, CK3, CK4, CK5, CK6, CK7, CK8 and CK9, CK10, CK12, CK 13, CK14, CK16, CK17, CK18, CK19 and CK2), epithelial cell adhesion molecule (EpCAM), N-cadherin, E-cadherin and vimentin, for example. Oncoproteins and oncogenes with likely therapeutic relevance due to mutations include, but are not limited to, WAF, BAX-1, PDGF, JAGGED 1, NOTCH, VEGF, VEGHR, CA1X, MIB1, MDM, PR, ER, SELS, SEM1, PI3K, AKT2, TWIST1, EML-4, DRAFF, C-MET, ABL1, EGFR, GNAS, MLH1, RET, MEK1, AKT1, ERBB2, HER2, HNF1A, MPL, SMAD4, ALK, ERBB4, HRAS, NOTCH1, SMARCB1, APC, FBXW7, IDH1, NPM1, SMO, ATM, FGFR1, JAK2, NRAS, SRC, BRAF, FGFR2, JAK3, RA, STK11, CDH1, FGFR3, KDR, PIK3CA, TP53, CDKN2A, FLT3, KIT, PTEN, VHL, CSF1R, GNA11, KRAS, PTPN11, DDR2, CTNNB1, GNAQ, MET, RB1, AKT1, BRAF, DDR2, MEK1, NRAS, FGFR1, and ROS1, for example.

In certain embodiments, the target cells may be endothelial cells which are detected using markers, by way of illustration and not limitation, CD136, CD105/Endoglin, CD144/VE-cadherin, CD145, CD34, Cd41 CD136, CD34, CD90, CD31/PECAM-1, ESAM,VEGFR2/Fik-1, Tie-2, CD202b/TEK, CD56/NCAM, CD73/VAP-2, claudin 5, Z0-1, and vimentin. Metastatic potential biomarkers include, but are limited to, urokinase plasminogen activator (uPA), tissue plasminogen activator (tPA), C terminal fragment of adiponectin receptor (Adiponectin Receptor C Terminal Fragment or Adiponectin CTF), kinases (AKT-PIK3, MAPK), vascular adhesion molecules (e.g., ICAM, VCAM, E-selectin), cytokine signaling (TNF-α, IL-1, IL-6), reactive oxidative species (ROS), protease-activated receptors (PARs), metalloproteinases (TIMP), transforming growth factor (TGF), vascular endothelial growth factor (VEGF), endothelial hyaluronan receptor 1 (LYVE-1), hypoxia-inducible factor (HIF), growth hormone (GH), insulin-like growth factors (IGF), epidermal growth factor (EGF), placental growth factor (PDF), hepatocyte growth factor (HGF), nerve growth factor (NGF), platelet-derived growth factor (PDGF), growth differentiation factors (GDF), VEGF receptor (soluble Flt-1), microRNA (MiR-141), Cadherins (VE, N, E), S100 Ig-CTF nuclear receptors (e.g., PPARα), plasminogen activator inhibitor (PAI-1), CD95, serine proteases (e.g., plasmin and ADAM, for example); serine protease inhibitors (e.g., Bikunin); matrix metalloproteinases (e.g., MMP9); matrix metalloproteinase inhibitors (e.g., TIMP-1); and oxidative damage of DNA.

Chemoresistance biomarkers include, by way of illustration and not limitation, argonaute/PIWI family (PL2L piwi like), 5T4, ADLH, β-integrin, α-6-integrin, c-kit, c-met, LIF-R, chemokines (e.g., CXCR7, CCR7, CXCR4, CXL9, CCL1, CXCL), TNF superfamily, interferons (IFN-γ), ESA, CD20, CD44, CD133, CKS, TRAF2 and ABC transporters, cancer cells that lack CD45 or CD31 but contain CD34 are indicative of a cancer stem cell; and cancer cells that contain CD44 but lack CD24.

Target molecules from cells may be from any organism, which includes, but is not limited to, pathogens such as bacteria, virus, fungus, and protozoa; malignant cells such as malignant neoplasms or cancer cells; circulating endothelial cells; circulating tumor cells; circulating cancer stem cells; circulating cancer mesenchymal cells; circulating epithelial cells; fetal cells; immune cells (B cells, T cells, macrophages, NK cells, monocytes); and stem cells; for example. In some non-limiting embodiments or examples of methods in accordance with the principles described herein, the sample to be tested is a blood sample from a mammal such as, but not limited to, a human subject.

Target cells of interest may be immune cells and include, but are not limited to, markers for white blood cells (WBC), Tregs (regulatory T cells), B cell, T cells, macrophages, monocytes, antigen presenting cells (APC), dendritic cells, eosinophils, and granulocytes. For example, markers such as, but not limited to, CD3, CD4, CD8, CD11c, CD14, CD15, CD16, CD19, CD20, CD31, CD33, CD45, CD52, CD56, CD 61, CD66b, CD123, CTLA-4, immunoglobulin, protein receptors and cytokine receptors and other CD markers that are present on white blood cells can be used to indicate that a cell is not a rare cell of interest.

In particular non-limiting examples, white blood cell markers include CD45 antigen (also known as protein tyrosine phosphatase receptor type C or PTPRC) and originally called leukocyte common antigen is useful in detecting all white blood cells. Additionally, CD45 can be used to differentiate different types of white blood cells that might be considered rare cells. For example, granulocytes are indicated by CD45+, CD15+, or CD16+, or CD66b+; monocytes are indicated by CD45+, CD14+; T lymphocytes are indicated by CD45+, CD3+; T helper cells are indicated by CD45+, CD3+, CD4+; cytotoxic T cells are indicated by CD45+, CD3+, CDS+; B-lymphocytes are indicated by CD45+, CD19+ or CD45+, CD20+; thrombocytes are indicated by CD45+, CD61+; and natural killer cells are indicated by CD16+, CD56+, and CD3−. Furthermore, two commonly used CD molecules, namely, CD4 and CD8, are, in general, used as markers for helper and cytotoxic T cells, respectively. These molecules are defined in combination with CD3+, as some other leukocytes also express these CD molecules (some macrophages express low levels of CD4; dendritic cells express high levels of CD11c, and CD123. These examples are not inclusive of all markers and are for example only.

In some cases, target analytes comprise fragments of lymphocytes, including proteins and peptides produced as part of lymphocytes such as immunoglobulin chains, major histocompatibility complex (MHC) molecules, T cell receptors, antigenic peptides, cytokines, chemokines and their receptors (e.g., Interluekins, C-X-C chemokine receptors, etc), programmed death-ligand and receptors (Fas, PDL1, and others) and other proteins and peptides that are either parts of the lymphocytes or bind to the lymphocytes.

In other cases, the target cells may be stem cells, and include, but are not limited to, the molecule fragments of stem marker cells including, PL2L piwi like, 5T4, ADLH, β-integrin, α6 integrin, c-kit, c-met, LIF-R, CXCR4, ESA, CD 20, CD44, CD133, CKS, TRAF2 and ABC transporters, cancer cells that lack CD45 or CD31 but contain CD34 are indicative of a cancer stem cell; and cancer cells that contain CD44 but lack CD24. Stem cell markers include common pluripotency markers like FoxD3, E-Ras, Sall4, Stat3, SUZ12, TCF3, TRA-1-60, CDX2, DDX4, Miwi, Mill GCNF, Oct4, Klf4, Sox2,c-Myc, TIF 1□Piwil, nestin, integrin, notch, AML, GATA, Esrrb, Nr5a2, C/EBPα, Lin28, Nanog, insulin, neuroD, adiponectin, apdiponectin receptor, FABP4, PPAR, and KLF4 and the like.

In other cases the rare cell may be a pathogen, bacteria, or virus or group thereof which includes, but is not limited to, gram-positive bacteria (e.g., *Enterococcus* sp. Group B streptococcus, Coagulase-negative staphylococcus sp. *Streptococcus viridans, Staphylococcus aureus* and *saprophyicus, Lactobacillus* and resistant strains thereof, for example); yeasts including, but not limited to, *Candida albicans*, for example; fungi including, but not limited to, *Candida auris*, for example; gram-negative bacteria such as, but not limited to, *Escherichia coli, Klebsiella pneumoniae, Citrobacter koseri, Citrobacter freundii, Klebsiella oxytoca, Morganella morganii, Pseudomonas aeruginosa, Proteus mirabilis, Serratia marcescens, Diphtheroids* (gnb), *Rosebura, Eubacterium hallii. Faecalibacterium prauznitzli, Lactobacillus gasseria, Streptococcus mutans, Bacteroides thetaiotaomicron, Prevotella Intermedia, Porphyromonas gingivalis Eubacterium rectale Lactobacillus amylovorus, Bacillus subtilis, Bifidobacterium longum Eubacterium rectale, E. eligens, E. dolichum, B. thetaiotaomicron, E. rectale, Actinobacteria, Proteobacteria, B. thetaiotaomicron, Bacteroides Eubacterium dolichum, Vulgatus, B. fragilis*, bacterial phyla such as Firmicuties (*Clostridia, Bacilli, Mollicutes*), Fusobacteria, Actinobacteria, Cyanobacteria, Bacteroidetes, Archaea, Proteobacteria, and resistant strains thereof, for example; viruses such as, but not limited to, COVID, HIV, HPV, Flu, and MRSA, for example; and sexually transmitted diseases. In the case of detecting rare cell pathogens, a collection particle is added that comprises an affinity agent, which binds to the rare cell pathogen population. Additionally, for each population of cellular rare molecules on the pathogen, a reagent is added that comprises an affinity agent for the cellular rare molecule, which binds to the cellular rare molecules in the population.

F. Target Cell Samples:

The target cell sample may be any that contains cells such as, for example, non-target cells and target cells. Target molecules may be detected from the target cells. The target molecules from cells may be from any organism, and are not limited to, pathogens such as bacteria, virus, fungus, and protozoa; malignant cells such as malignant neoplasms or cancer cells; circulating endothelial cells; circulating tumor cells; circulating cancer stem cells; circulating cancer mesochymal cells; circulating epithelial cells; fetal cells; immune cells (B cells, T cells, macrophages, NK cells, monocytes); and stem cells; for example. In other examples of methods in accordance with the invention described herein, the sample to be tested is a fluid sample from an organism such as, but not limited to, a plant or animal subject, for example. In some non-limiting embodiments or examples of methods in accordance with the principles described herein, the sample to be tested is a sample from an organism such as, but not limited to, a mammalian subject, for example. Target cells with target molecules may be from a tissue of mammal, for example, lung, bronchus, colon, rectum, pancreas, prostate, breast, liver, bile duct, bladder, ovary, brain, central nervous system, kidney, pelvis, uterine corpus, oral cavity or pharynx or cancers.

II. Electrochemical Labels:

The terms “electrochemical label” or “label” refer to a chemical entity (organic or inorganic) which is capable of generating a detectable electrochemical signal, detected for example by electrochemical means. The label may be detected directly on a substrate, on a porous matrix, or in a liquid. Analytical labels are molecules, metals, ions, atoms, or electrons that are detectable using an analytical method to yield information about the presence and amounts of the target analytes in a sample. The phrase “electrochemical” refers to potentiometric, capacitive and redox active compounds such as: metals such as Pt, Ag, Pd, Au and many others; particles such as gold sols, graphene oxides and many others; electron transport molecules such as ferrocene, ferrocyanide, Os(VI)bipy and many others; electrochemical redox active molecules such as aromatic alcohols and amines such as 4-aminophenyl phosphate, 2-naphthol, para-nitrophenol phosphate; thiols or disulfides such as those on aromatics, aliphatics, amino acids, peptides and proteins; aromatic heterocyclic containing non-carbon ring atoms, such as oxygen, nitrogen, or sulfur such as imidazoles, indoles, quinolones, thiazole, benzofuran and many others. Electrochemical analytical labels are detectable by impedance, capacitance, amperometry, electrochemical impedance spectroscopy and other measurement.

III. Affinity Agents:

The analyte detection particles include affinity agents to couple with the target analytes. The affinity agents have an “affinity” for the target analytes. As used herein, the term “affinity” refers to the ability to specifically couple with a select target analyte. Selective binding involves the specific recognition of a target molecule compared to substantially less recognition of other molecules. The coupling may be through non-covalent binding such as a specific ionic binding, hydrophobic binding, pocket binding and the like. In contrast, “non-specific binding” may result from several factors including hydrophobic or electrostatic interactions between molecules that are general and not specific to any particular molecule in a class of similar molecules. The affinity agents may be attached to the analyte detection particles by linker arms including cleavable or non-cleavable bonds depending on the intended detection method. The coupling may be by any manner of attachment provided the coupling is sustained to the extent required for subsequent detection steps.

The affinity agents are coupled with the target analytes in order to associate the target analytes with the labels. The labels may be removed from the analyte detection particles while the target analytes remain coupled with the analyte detection particles, or the target analytes may be cleaved from the analyte detection particles while the labels remain coupled. In one aspect, for example, the labels are cleaved and collected for further evaluation, e.g., to determine the amount or concentration of the target analytes in the sample. The target analytes may then be cleaved from the analyte detection particles and further processed, such as by visual examination of target cells.

An affinity agent can be an immunoglobulin, protein, peptide, metal, carbohydrate, metal chelator, nucleic acid, aptamer, xeno-nucleic acid, xeno-peptide, antigen which binds to an immunoglobulin analyte, or other molecule capable of binding selectively to a particular molecule. The affinity agents which are immunoglobulins may include complete antibodies or fragments thereof, including the various classes and isotypes, such as IgA, IgD, IgE, IgG1, IgG2a, IgG2b and IgG3, IgM, etc. Fragments thereof may include Fab, Fv and F(ab')2, and Fab', for example. In addition, aggregates, polymers, and conjugates of immunoglobulins or their fragments can be used where appropriate so long as binding affinity for a particular molecule is maintained.

Antibodies are specific for target molecules and can be monoclonal or polyclonal. Such antibodies can be prepared by techniques that are well known in the art such as immunization of a host and collection of sera (polyclonal) or by preparing continuous hybrid cell lines and collecting the secreted protein (monoclonal) or by cloning and expressing nucleotide sequences or mutagenized versions thereof coding at least for the amino acid sequences required for specific binding of natural antibodies. Polyclonal antibodies and monoclonal antibodies may be prepared by techniques that are well known in the art. For example, in one approach monoclonal antibodies are obtained by somatic cell hybridization techniques. Monoclonal antibodies may be produced according to the standard techniques of Köhler and Milstein, Nature 265:495-497, 1975. Reviews of monoclonal antibody techniques are found in Lymphocyte Hybridomas, ed. Melchers, et al. Springer-Verlag (New York 1978), Nature 266: 495 (1977), Science 208: 692 (1980), and Methods of Enzymology 73 (Part B): 3-46 (1981). In general, monoclonal antibodies can be purified by known techniques such as, but not limited to, chromatography, e.g., DEAE chromatography, ABx chromatography, and HPLC chromatography; and filtration, for example.

An affinity agent can additionally be a "cell affinity agent" capable of binding selectively to a target molecule which is used for typing a target cell or measuring a biological intracellular process of a target cell. These affinity agents can be immunoglobulins that specifically recognize and bind to an antigen associated with a particular cell type and whereby the antigen is a component of the cell. The cell affinity agent is capable of being absorbed into or onto the cell. Selective cell binding typically involves binding (between molecules) that is relatively dependent on specific structures of the binding pair (affinity agent target molecule). Many other suitable affinity agents would be well known to those of ordinary skill in the relevant art.

IV. Linker Arms:

Linker arms are provided which serve various purposes for the connection of affinity agent to reagents capable of generating an electrochemical label or capable of binding a surface in the microwell such as the surface of a capture particle or inner surface of the microwell. The labels, collection particles and affinity agents are coupled with the reagents or surfaces by way of linker arms. The linker arms are attached to the functionalized base particles. In the synthesis and use of the analyte detection particles, the linker molecules are at some point coupled at one end to the base particles and at the other end to the labels, collection particles, or affinity agents. The linker arms are thus formed using linker molecules that include functional groups suited to provide these attachments. These attachments may use a variety of complementary functional groups that react together to join these components. For example, in one embodiment the linker arms are coupled with the base particles by way of surface amine groups. The linker arms are generally non-cleavable under select conditions. For example, if the labels of an analyte detection particle are to be removed and tested, and no further processing is intended for the target analytes, then the affinity linker arms are not required to be cleavable.

One end of the linker arm is bonded to the reagent or surface and the other end to the affinity agent. As used herein, the term "bond" may include any type of coupling which functions as required for the indicated purpose. The bond may be of any type, including covalent or ionic for example. A wide variety of linkages as known in the art may be used for binding the linker arms to the base particles. For example, carboxylic acid, hydroxyl, sulfide and amine groups generally allow for suitable binding of the linker arms to the base particles. Other bonds may include esters, amides and disulfide bonds that bind with the base particles, and other well-known bonds may instead be used. As a further example, the bonds may comprise any suitable for the attachment of PEG groups, such as amine-reactive N-hydroxysuccinimde (NHS) esters, imido esters, difluro nitrobenzene, NHS-haloacetyl, NHS maleimide and NHS pyridyldithiol groups.

V. Electrochemical Labels:

The phrase "electrochemical labels" refers to potentiometric, capacitive and redox active compounds such as: metals such as Pt, Ag, Pd, Au and many others; particles such as gold sols, graphene oxides and many others; electron transport molecules such as ferrocene, ferrocyanide, Os(VI) bipy and many others; electrochemical redox active molecules such as aromatic alcohols and amines such as 4-aminophenyl phosphate, 2-naphthol, para-nitrophenol phosphate; thiols or disulfides such as those on aromatics, aliphatics, amino acids, peptides and proteins; aromatic heterocyclic containing non-carbon ring atoms, such as oxygen, nitrogen, or sulfur such as imidazoles, indoles, quinolones, thiazole, benzofuran and many others. Electrochemical analytical labels are detectable by impedance, capacitance, amperometry, electrochemical impedance spectroscopy and other measurement.

VI. Size Exclusion:

In one aspect, the analyte complexes are collected based on size exclusion. A "retention matrix" (sometimes referred to herein as a "size exclusion filter") is used such that the bound target analytes are selectively retained by the matrix. Porous matrices are used where the analyte detection particles are sufficiently smaller than the pore size of the matrix such that physically the particles can pass through the pores. In other examples, the particles are sufficiently larger than the pore size of the matrix such that physically the particles cannot pass through the pores.

In particular, the desired target analytes are separated from other components of the sample based on the sizes of the analyte complexes. Thus, the analyte complexes are such that they are retained on the matrix, while neither the analyte detection particle alone, or the target analyte alone, is retained on the same matrix. Thus, the base particles and/or other components of the analyte detection particles are retained on a matrix once coupled with a target analyte. All of the analyte detection particles selectively bind to the target analytes and are thereby retained on the matrix.

Size exclusion utilizes a “retention matrix” or “matrix” which operates by limiting passage therethrough based on size, referred to herein as retention size. That is, a target analyte of interest has a retention size if it is retained by, rather than passing through, the retention matrix. By way of example, a retention substrate may comprise a porous matrix. The porous matrix may be a solid or semi-solid material, which is impermeable to liquid except through one or more pores of the matrix. The porous matrix is associated with a porous matrix holder and a liquid holding well. The association between the porous matrix and the porous matrix holder can be achieved with the use of an adhesive. Herein, the terms “porous matrix holder”, “holder”, and “microwell” may be used interchangeably. The association between the porous matrix in the holder and the liquid holding well can be through direct contact or with a flexible gasket surface.

The retention size of the particle is dependent on one or more of the nature of the target analyte, the nature of the sample, the permeability of the cell, the size of the cell, the size of the nucleic acid, the size of the affinity agent, the magnetic forces applied for separation, the nature and the pore size of a filtration matrix, the adhesion of the particle to matrix, the surface of the particle, the surface of the matrix, the liquid ionic strength, liquid surface tension and components in the liquid, the number, size, shape and molecular structure of associated label particles, for example. In some non-limiting embodiments or examples, the average diameter of the collection particles is at least 1 μm but not more than about 20 μm.

The porous matrix may be a solid or semi-solid material, and may be comprised of an organic or inorganic, water insoluble material. The porous matrix and holder are non-bibulous, which means that it is incapable of absorbing liquid. In some non-limiting embodiments or examples, the amount of liquid absorbed by the porous matrix is less than about 2% (by volume), or less than about 1%, or less than about 0.1%, or less than about 0.01%, or 0%. The porous matrix is non-fibrous, which means that the membrane is at least 95% free of fibers, or at least 99% free of fibers, or 100% free of fibers. The matrix does not include fibrous materials such as cellulose (including paper), nitrocellulose, cellulose acetate, rayon, diacetate, lignins, mineral fibers, fibrous proteins, collagens, synthetic fibers (such as nylons, dacron, olefin, acrylic, polyester fibers, for example) or, other fibrous materials (glass fiber, metallic fibers), which are bibulous and/or permeable.

The matrix can have any of a number of shapes such as, for example, a planar or a flat surface (e.g., strip, disk, film, and plate). In some non-limiting embodiments or examples, the shape of the porous matrix is circular, oval, rectangular, square, track-etched, planar or flat surface, for example. The matrix may be fabricated from a wide variety of materials, which may be naturally occurring or synthetic, polymeric or non-polymeric. The shape of the porous matrix is dependent on one or more of the nature or shape of the holder for the membrane, of the microfluidic surface, of the liquid holding well for example.

The matrix and holder may, for example, be fabricated from plastics such as, for example, polycarbonate, poly (vinyl chloride), polyacrylamide, polyacrylate, polyethylene, polypropylene, poly-(4-methylbutene), polystyrene, polymethacrylate, poly-(ethylene terephthalate), nylon, poly (vinyl butyrate), poly(chlorotrifluoroethylene), poly(vinylbutyrate), polyimide, polyurethane, and paraylene; silanes; silicon; silicon nitride; graphite; ceramic material (such, e.g., as alumina, zirconia, PZT, silicon carbide, aluminum nitride); metallic material (such as, e.g., gold, tantalum, tungsten, platinum, and aluminum); glass (such as, e.g., borosilicate, soda lime glass, and Pyrex®); and bioresorbable polymers (such as, e.g., polylactic acid, polycaprolactone and polyglycolic acid); for example, either used by themselves or in conjunction with one another and/or with other materials.

The porous matrix for each liquid holding well comprises at least one pore and no more than about 2,000,000 pores per square centimeter ($cm^2$). In some non-limiting embodiments or examples, the number of pores of the porous matrix per $cm^2$ is 1 to about 2,000,000, or 1 to about 200,000, or 1 to about 5,000, or 1 to about 1,000, or 1 to about 100, or 1 to about 50, or 1 to about 10. Herein, the terms “porous matrix, “matrix”, “plastic film”, and “size exclusion filter” may be used interchangeably.

The density of pores in the porous matrix is about 1% to about 20%, or about 1% to about 10%, or about 1% to about 5%, or about 5% to about 10%, for example, of the surface area of the porous matrix. In some non-limiting embodiments or examples, the size of the pores of a porous matrix is that which is sufficient to preferentially retain liquid while allowing the passage of liquid droplets formed in accordance with the principles described herein.

The size of the pores of the porous matrix is dependent on the nature of the liquid, the size of the cell, the size of the collection particle, the size of analytical label, the size of the target analytes, the size of the label particles, and/or the size of non-target cells, for example. In some non-limiting embodiments or examples, the average size of the pores of the porous matrices is about 0.1 to about 20 microns, or about 0.1 to about 1 micron, or about 1 to about 20 microns, or about 1 to about 2 microns, for example.

Pores within the matrix may be fabricated in accordance with the principles described herein, for example, by thermal wafer fabrication (Si, SiO2), metal oxide semi-conductor (CMOS) fabrication, micro-milling, irradiation, molding, machining, laser ablation and other manufacturing processes for producing microsieves, membranes, macrowells of mm diameters and microwells of um diameters for example, or a combination thereof.

In some non-limiting embodiments or examples, the porous matrix may be attached to a holder which can be associated with the bottom of a liquid holding well and to the top of a vacuum manifold where the porous matrix is positioned such that liquid can flow from the liquid holding well to the vacuum manifold. In some cases, biological microelectromechanical (BioMEMS) technology is used to apply liquids and vacuums to the porous matrix in the holder. In some non-limiting embodiments or examples, the porous matrix in the holder can be associated with a microfluidic surface, top cover surface and/or bottom cover surface. The holder may be constructed of any suitable material that is compatible with the material of the matrix. Examples of such materials include, by way of example and not limitation, any of the materials listed above for the porous matrix. The material for the housing and for the porous matrix may be the same or different. The holder may also be constructed of non-porous glass or plastic film.

Examples of plastic film materials for fabricating the holder include polystyrene, polyalkylene, polyolefins, epoxies, Teflon®, PET, chloro-fluoroethylenes, polyvinylidene fluoride, PE-TFE, PE-CTFE, liquid crystal polymers, Mylar®, polyester, polymethylpentene, polyphenylene sulfide, and PVC plastic films. The plastic film can be metallized such as with aluminum. The plastic films can have relative low moisture transmission rate, e.g. 0.001 mg per $m^2$-day. The porous matrix may be permanently fixed attached to a holder by adhesion using thermal bonding, mechanical fastening or through use of permanently adhesives such as drying adhesive like polyvinyl acetate, pressure-sensitive adhesives like acrylate-based polymers, contact adhesives like natural rubber and polychloroprene, hot melt adhesives like ethylene-vinyl acetates, and reactive adhesives like polyester, polyol, acrylic, epoxies, polyimides, silicones rubber-based and modified acrylate and polyurethane compositions, natural adhesive like dextrin, casein, lignin. The plastic film or the adhesive can be electrically conductive materials and the conductive material coatings or materials can be patterned across specific regions of the holder surface.

The porous matrix in the holder may generally be part of a filtration module where the porous matrix is part of an assembly for convenient use during filtration. The holder can have a surface which facilitates contact with associated surfaces but is not permanently attached to these surfaces and can be removed. A top gasket may be applied to the removable holder between the liquid holding wells. A bottom gasket may be applied to the removable holder between the manifold for vacuum. The gasket can be a flexible material that facilitates a liquid or air impermeable seal upon compression. The holder may be constructed of gasket material. Examples of gasket shapes include flat, embossed, patterned, or molded sheets, rings, circles, ovals, with cut out areas to allow sample to flow from porous matrix to vacuum manifold. Examples of gasket materials include paper, rubber, silicone, metal, cork, felt, neoprene, nitrile rubber, fiberglass, polytetrafluoroethylene such as PTFE or Teflon, or a plastic polymer such as polychlorotrifluoroethylene.

1. Time:

Contact of the sample with the porous matrix is continued for a period of time sufficient to achieve retention of bound target analytes on a surface as discussed. The period of time used is dependent on one or more of the nature and size of the different populations of target molecules and/or target cells, the nature of the porous matrix, the size of the pores of the porous matrix, the level of vacuum applied to the sample on the porous matrix, the volume to be filtered, and the surface area of the porous matrix, for example. In some non-limiting embodiments or examples, the period of contact may be as short as 1 minute or as long as 1 hour.

2. Vacuum:

A pressure gradient (e.g., by way of vacuum) may be applied to the sample on the porous matrix to facilitate passage of non-retained species, and other sample contents through the matrix. The pressure gradient applied is dependent on one or more of the nature and size of the different populations of bound species, the nature of the porous matrix, and the size of the pores of the porous matrix, for example. In some non-limiting embodiments or examples, the level of vacuum may be as little as 1 millibar and as much as 100 millibar or more. In some non-limiting embodiments or examples, the vacuum is an oscillating vacuum, which means that the vacuum is applied intermittently at regular or irregular intervals, which may range, for example, from 1 second to 600 seconds. In this approach, the vacuum may be oscillated from 0 millibar to about 10 millibar, during some or all of the application of vacuum to the sample. The oscillating vacuum may be achieved using an on-off switch, for example, and may be conducted automatically or manually.

Figure 2:
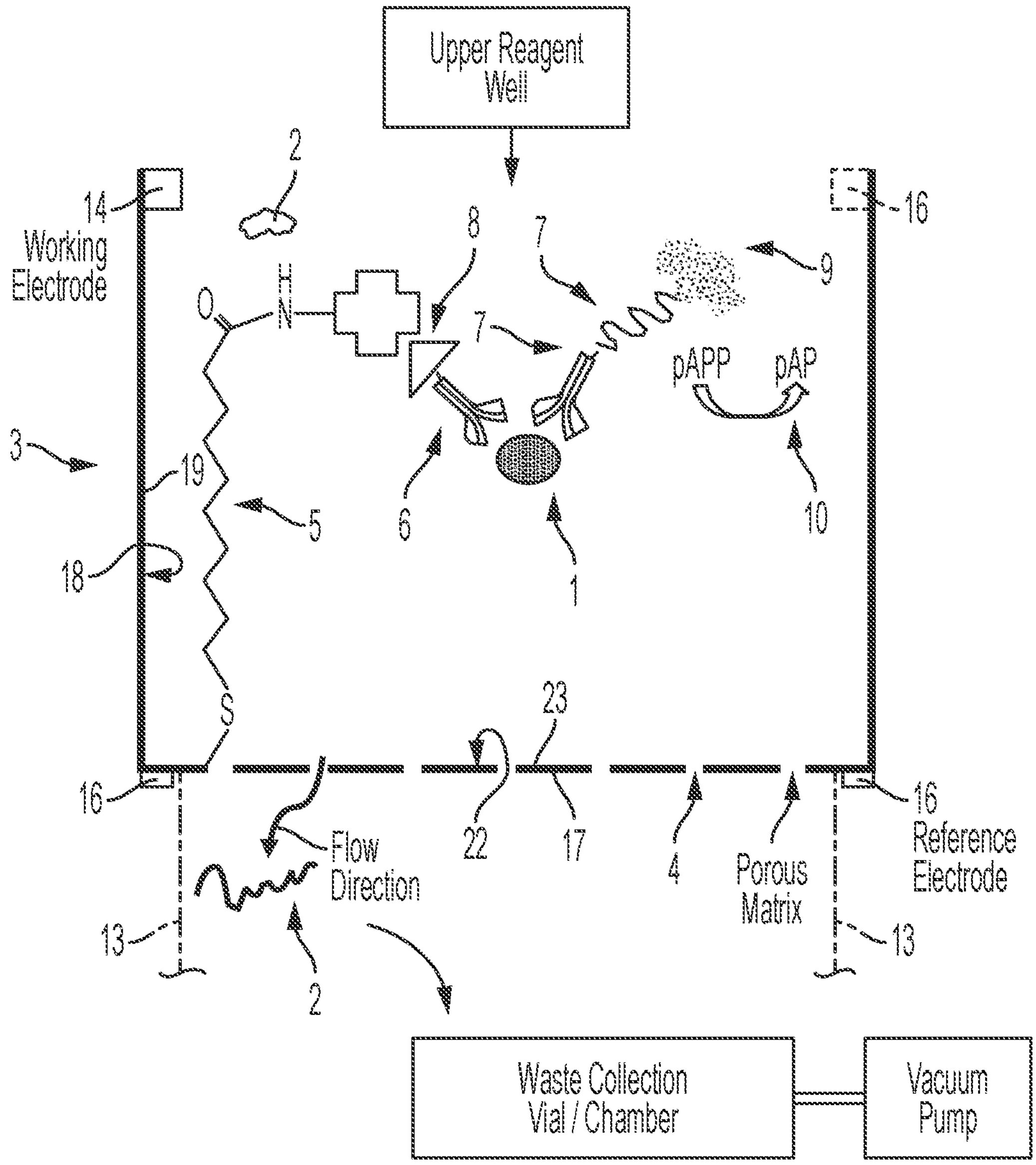
FIG. 2 is schematic drawing, in accordance with the principles of the present invention, showing an example in diagrammatic form the manner in which the analyte complexes are used to collect the target analytes into microwells on to a surface capable of capture of the complex.

VII. Collection, Detection and Release of Analyte Complexes in Size Exclusion Filters Aligned with Microwells:

The following figures, where like reference numbers correspond to like or functionally equivalent elements, exemplify a system and method for isolation, detection and release of target analytes from non-target analytes in complex samples into microwells with size exclusion filters using multiple microwells, each with a size exclusion filter bottom and a capture surface capable of retaining target analytes coupled with the affinity agent(s) (FIGS. 1-2). In particular, target analytes which are forming a complex(es) with the affinity agent(s) for detection and capture of target analytes, which may be separated from the other components of the sample using a surface capable of capture of the complex inside the microwell with a size exclusion filter.

In FIG. 1 there is shown, in diagrammatic form, a non-limiting embodiment or example of the manner in which analyte complexes are used to collect target analytes into microwells using capture particles. In some non-limiting embodiments or examples, collection can include isolating at least one target analyte 1 from non-target components (e.g., analytes) 2 in complex samples via a filtering device that includes a microwell 3 and a size exclusion filter 4. In an example, target analytes 1 couple with the affinity agent(s) 6, forming a complex(es) which may be separated from the non-target components 2 of the sample. In an example, target analytes are coupled to a binding surface of or in the microwell 3. Herein, the terms "binding surface" and "capture surface" may be used interchangeably.

A sample that is "positive" for target analytes 1 will bind to the affinity agents 6 for capture and affinity agents 7 for detection. The affinity agents 6 for capture have a reagent 8 capable of binding to a binding surface 20 of a particle 5 in the microwell 3. The affinity agents 7 for detection have a reagent 9 capable of generation of electrochemical labels 10 in the microwell 3. The particles 5 binding the complex have binding surfaces 20 that bind the reagent 8 to the particles 5 and are sufficiently large enough not to pass through the size exclusion filter 4 (sometimes referred to herein as a "retention matrix" or "matrix") at the bottom of the microwell 3.

In FIG. 2 there is shown a second diagrammatic form of a non-limiting embodiment or example of the manner in which the analyte complexes can be used to collect the target analytes 1 into microwells 3. In some non-limiting embodiments or examples, the complex can be captured on the surface 18 of the microwell 3 by a reagent 8 capable of binding the affinity agent 6 for capture. In an example, the collection method can include isolating target analytes 1 from non-target components (e.g., analytes) 2 in complex samples via a filtering device that includes a microwell 3 and a size exclusion filter 4. In an example, target analytes 1 couple to one or more binding surface(s) (18 and/or 22) in the microwell 3 using a reagent 8 capable of binding of affinity agents 6 for capture. A sample that is "positive" for the target analytes 1 will bind to the affinity agents 6 for capture and the affinity agents 7 for detection. The affinity agents 6 for capture have reagent 8 capable of binding to the binding surface(s) (18 and/or 22) in the filtration microwell 3. The affinity agents 7 for detection have reagent 9 capable of generation of electrochemical labels 10 in the microwell 3.

Both cases (FIGS. 1-2) result in complexes wherein target analytes are coupled to affinity agents for detection and capture of target analytes present in the sample. In some non-limiting embodiments or examples, this results in collection of the complexes in close proximity to a working electrode 14 and a reference electrode 16 to facilitate the detection of the electrochemical labels 10 produced. However, for a negative sample, analyte complexes are not formed and affinity agents for a target analyte 6 for detection. In both cases, the content of the cells captured can be released by incubating the isolated cells with a reagent, such as a surfactant, or acid, capable of lysing the cells and releasing biomolecule(s) for passage through the size exclusion filter 4 and a capillary 13 (shown by phantom lines) below the size exclusion filter 4.

The materials and methods described herein below in Examples 1 and 2 are useful with a broad variety of materials which may be suitably for isolating and releasing target analytes 1 from non-target complexes (e.g., analytes) 2 in complex samples in microwell 3 including in alignment therewith size exclusion filter 4. Target analytes couple with the affinity agent(s), forming a complex(es) which may be separated from the other components of the sample. The analyte complexes are collected in order to separate the target analyte from the sample. In addition to the analyte complexes present in the test material will be non-target analytes 2, unbound affinity agent and other sample components. In an exemplary process for separation, the analyte complexes are directly separated by means of the size exclusion filter 4 described in either FIG. 1 or FIG. 2. The size(s) of the pores of the size exclusion filter 4 is/are selected such that analyte complexes are retained in the microwell 3 while the unbound analyte and unbound detection reagents pass through the pores of the size exclusion filter 4 out of the microwell 3.

Example 1: Method for Isolating and Release of Target Analytes from Complex Samples Materials:

| | |
|---|---|
| Capture particles | Neutravidin or streptavidin-coated polystyrene microparticles (18, 41, 75, 101, 148 and 196 μm diameter; SPHERO SVP-200-4, SVP-400-4, SVP-1000-4, VPX-1400-4 and SVP-2000-4) were obtained from Spherotech (Lake Forest, IL, USA). |
| Human cells and antibodies | Breast cancer cells (SKBR3, HTB-30) and hybridoma cells producing Her2/nue-specific monoclonal antibodies (mAbs) (clone NB3, HB-10205) were acquired from the American Type Culture Collection (Manassas, VA, USA). |
| Attachment of reagents to affinity agents | Antibodies separately conjugated to ALP (Thermo Fisher Scientific) using the FastLink ALP kit (Abnova, Taipei City, Taiwan), and to biotin-PEG4 and to Dylight 488 using the EZ-Link NHS-conjugation kits (Thermo Fisher Scientific). The resultant antibody conjugates were stored at 4° C. |

Unless otherwise noted all other materials were purchased from Sigma Aldrich or Thermo Fisher Scientific.

Figure 3A:
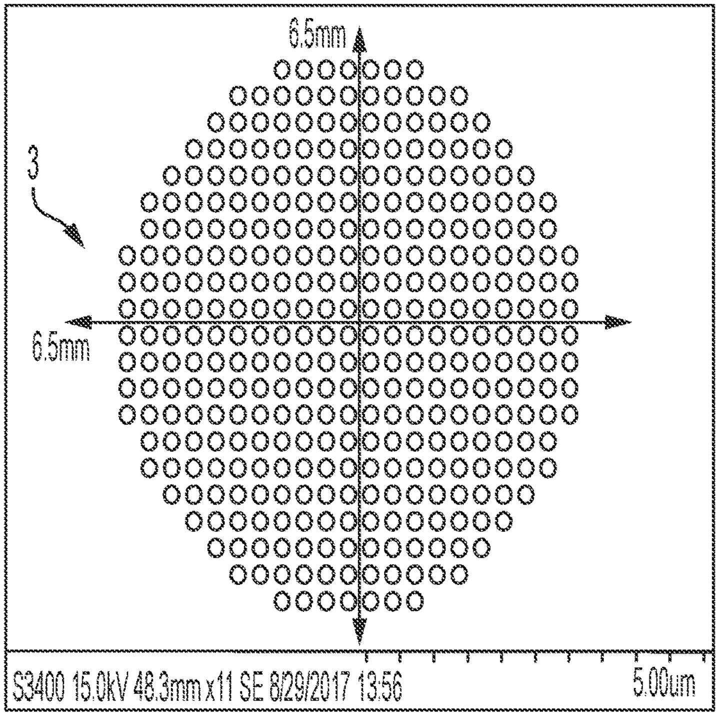
FIG. 3A is a scanning electron microscope (SEM) image showing, in accordance with the principles of the present invention, an example of array of microwells, wherein each microwell includes a size exclusion filter (FIG. 3C) in alignment with said microwell.
Figure 3B:
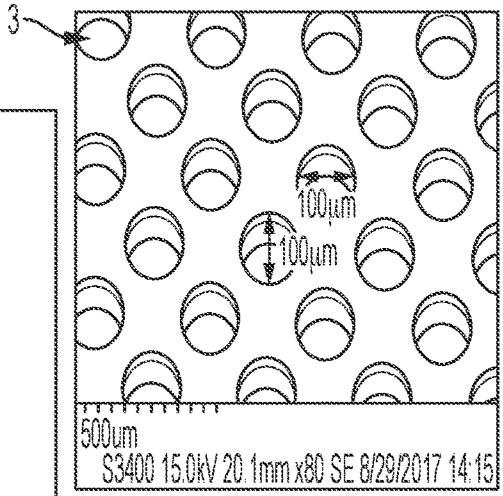
FIG. 3B is an isolated enlarged view of a portion of the array of microwells shown in FIG. 3A.
Figure 3C:
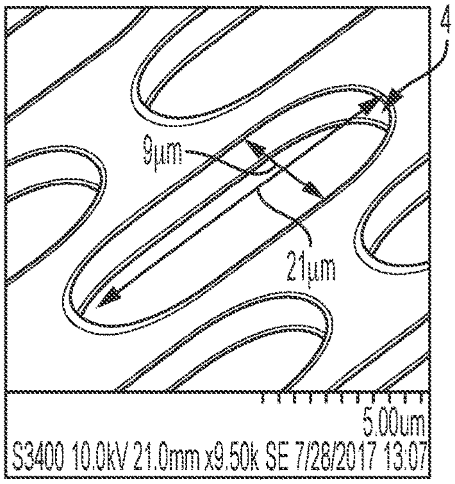
FIG. 3C is an enlarged SEM image of a portion of a size exclusion filter including pores, in an example, elongated slots, at the bottom of one of the microwells.

Method of Making a Filtering Device Including One or More Microwells Each Having an Associated Size Exclusion Filter In FIG. 3A, there is shown a scanning electron microscope (SEM) image of a filtering device, in accordance with the principles of the present invention, made by the following method wherein an array of microwells 3 are formed in a circular area having a diameter of 6.5 mm, for example. FIG. 3B is an enlarged view of the microwells 3 each having a diameter of ~110 μm and FIG. 3C is an isolated view of a portion of the size exclusion filter 4 at the bottom of one of the microwells 3 of FIGS. 3A-3B including a plurality of pores. In some non-limiting embodiments or examples, each pore may be in the form of a slot (e.g., 9.0 μm width×21.0 μm length—having an aspect ratio (width/length) >2.0). However, this is not to be construed in a limiting sense since each pore may have any suitable and/or desirable shape and/or dimensions selected by one of ordinary skill in the art for a particular application.

Herein, dimensions, e.g., of the diameter of the circular area in FIG. 3A, the dimensions of pores in the form of slots with dimensions 9.0 μm×21.0 μm shown in FIG. 3C, and the like are provided strictly for the purpose of illustration and not of limitation since such any one or more of such dimensions may vary unintentionally or may be varied intentionally due to, for example, manufacturing tolerances and/or the requirements for a particular application, e.g., to filter out unbound analyte and unbound detection reagents from microwell 3. In some non-limiting embodiments or examples, it is to be understood that any dimension listed herein may vary or be varied by, for example, ±1%, ±3%, ±5%, ±10%, ±20%, ±50%, +100%, +200%, +300%, or more, or some combination thereof, e.g., −50% and +200%.

In some non-limiting embodiments or examples, the fabrication of the filtering device starts by double polishing a surface of a first layer, e.g., a semiconductor (e.g., silicon) wafer substrate (e.g., 300 μm thick). A second layer (e.g., up to 4 μm thick) of insulating material, e.g., dense, high-quality thermal SiO2 film, was then applied or grown on the polished surface of the semiconductor wafer, after which a slotted membrane grid was patterned on the exposed surface of the SiO2 film by photolithography and transferred to an underlying etch mask using a dry etch process that was used to form in the SiO2 film the plurality of pores that define the size exclusion filter 4.

A second dry etch process was then used to create an array of microwells 3 (e.g., 341 microwells—each of 110 μm diameter) in the semiconductor wafer above the SiO2 film. More specifically, the thus fabricated wafer (i.e., the semiconductor wafer including the SiO2 film) was then mounted on a carrier wafer with the SiO2 film facing the carrier wafer and with the semiconductor side exposed for further processing. The microwells 3 were lithographically patterned on the semiconductor wafer, then etched through the entire thickness of the semiconductor wafer substrate, thereby creating holes or openings through the semiconductor wafer substrate between a first, top surface and a second, bottom surface of the semiconductor wafer substrate, to reveal the pores of the size exclusion filters 4 using a deep reactive ion etch process. The thus fabricated semiconductor wafer was then released from the carrier wafer and re-mounted with the $SiO_2$ film side facing upwards for further processing.

The size exclusion filters 4 serve for liquids and unbound materials to pass—as described above. In a final step, the fabricated semiconductor wafer is diced and arranged semiconductor wafer side up for processing.

In some non-limiting embodiments or examples, the first and second layers of the filtering device can be any biologically suitable and/or desirable electrically non-conductive inert material, e.g., a plastic.

Figure 3D:
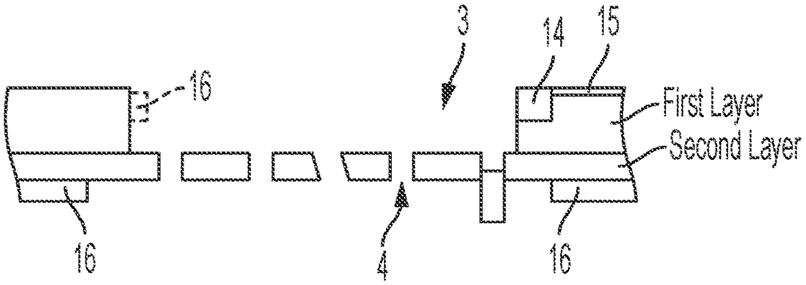
FIG. 3D is a schematic drawing, in accordance with the principles of the present invention, of a cross-section one of the microwells of FIGS. 3A-3B aligned with a size exclusion filter and, more particularly, aligned with a plurality of pores of the size exclusion filter, wherein the microwell is formed in a first layer, e.g., a semiconductor (e.g., Si) wafer or an electrically non-conductive inert material, and the size exclusion filter is formed in a second layer, e.g., an SiO2 layer or an electrically non-conductive inert material.

A schematic cross-section of one microwell 3 formed in a first layer in alignment over a size exclusion filter 4 or a portion of a size exclusion filter 4 formed in a second layer and including a plurality of pores is shown in FIG. 3D which also shows schematically an electrically conductive working electrode 14 optionally disposed at the top of the microwell 3 and an electrically conductive counter or reference electrode 16 optionally disposed around the bottom of the size exclusion filter 4 (as shown by solid lines in FIGS. 1, 2 and 3D) or, optionally, at the top of the microwell 3 (as shown by dashed lines in FIGS. 1, 2 and 3D). One or more conductive circuit traces 15 formed on the top surface of the first layer and coupled in electrical contact with the working electrode 14 and, optionally, the reference electrode 16 at the top of the microwell 3 can be used to provide suitable electrical signal(s) to the working electrode 14 and optional reference electrode 16 at the top of the microwell 3 from one or more signal source(s) positioned remote from the microwell 3. When provided around the bottom of the size exclusion filter 4, reference electrode 16 can be coupled to receive the or a signal from the same or a different a signal source in a manner known in the art. Working electrode 14, conductive trace 15, and reference electrode 16 will be described further hereinafter with reference to FIGS. 5A-5C.

The foregoing examples of forming microwells 3 with size exclusion filters 4 is not to be construed in a limiting sense since other method(s) of forming microwells 3 with size exclusion filters 4 is/are envisioned. Moreover, the position(s) of working electrode 14 and/or reference electrode 16 is/are for the purpose of illustration and is/are not to be construed in a limiting sense since it is envisioned that working electrode 14 and/or reference electrode 16 may be positioned at any suitable and/or desirable location(s) on or adjacent microwell 3 and/or size exclusion filter 4, including inside microwell 3, as may be deemed suitable and/or desirable. In an example, working electrode 14 and reference electrode 16 can be placed directly into microwell 3 in spaced relation to each other and held in spaced relation to the wall(s) of microwell 3, e.g., by supports attached to the surface of the wall(s) of microwell 3, on opposite sides of the wall(s), to allow current to be generated in microwell 3.

Rapid Sample Processing Procedure:

With specific reference to FIGS. 1 and 2 and with ongoing reference to FIGS. 3A-3D, negative pressure for filtration through a microwell 3 and the pores of the size exclusion filter 4 in alignment with the microwell 3 was provided by vacuum pump using the above-described filtering device following the teachings of US 20180283998 to Pugia et al. (incorporated herein by reference). In some non-limiting embodiments or examples, a capillary 13 is in fluid communication with the underside (or outlet side) of size exclusion filter 4 and an upper reagent well, positioned above microwell 3, is used for introducing processing samples, liquids, and particles suspension into the microwell 3 and size exclusion filter 4. The combination of the upper reagent well, the above-described filtering device, and the capillary 13 may define at least part of a filtering system. As shown in FIGS. 1-2, the filtering system may further include a waste collection vial/chamber in fluid communication with an end of the capillary 13 opposite the above-described filtering device and a vacuum pump for applying a vacuum to the underside (or outlet side) of size exclusion filter 4 via the capillary 13 and the waste collection vial/chamber.

The steps for using the above-described filtering system starts by adding the sample to the upper reagent well followed by adding liquid reagents to the upper reagent well. The sample processing occurs by application of a hydrodynamic force in a waste collection vial/chamber coupled to the microwells 3 and size exclusion filters 4 via the capillary 13 that drives, sucks, or draws the sample and liquid reagent fluids from the upper reagent well into the microwell 3 and, at a suitable time, through the size exclusion filter 4 into the waste collection vial/chamber. A vacuum pump coupled to the waste collection chamber maintains the desired hydrodynamic force in the waste collection vial/chamber to drive, suck, or draw the sample and liquid reagent fluids through the microwell 3 and size exclusion filter 4. Below the desired pressure setpoint for filtration, the hydrodynamic force can be removed.

In some non-limiting embodiments or examples, the affinity reagents were allowed to incubate in the microwell 3 for up to 60 minutes with the sample before the vacuum was applied to drive, force, suck, or draw the liquid through the size exclusion filters 4. After which, wash buffers were added to the microwell 3 and removed by vacuum. The application of negative pressure is sufficient to remove the liquid from the microwell 3 after each wash cycle. This process was carried out multiple times to wash the samples. All vacuum pressures given are in reference to gauge pressure; i.e. 10 mbar vacuum refers to an absolute pressure of 10 mbar below atmospheric pressure. The above-described filtering device, including microwells 3 and size exclusion filters 4, was subsequently recovered and viewed under a microscope.

Method to Demonstrate Capture Particle Surface in Microwells:

Capture particles were load into microwells 3 with size exclusion filters 4 using the rapid sample processing procedure according to FIG. 1. The steps to accomplish this starts by blocking 250 μL of neutravidin or streptavidin-coated polystyrene particles (1.0% w/v) with 250 μL of SuperBlock™ blocking buffer (ThermoFisher Scientific) over night at 37° C. The capture particles (18-200 μm diameter, 1% v/w) are centrifuge at 2,500 rcf for 2.5 minutes, remove supernatant and 500 μL of phosphate buffered saline (PBS) and particles are resuspended and washed twice with PBS before finally be resuspended in PBS. Next, the microwells 3 and size exclusion filters 4 of the filtering device described above were treated with 100 μL of SuperBlock™ blocking buffer overnight at 37° C. without vacuum applied. Then 100 μL the block capture particles were loaded into the upper reagent well and a vacuum of 10 mbar was applied to the waste collection vial/chamber to allow addition of a mixed suspension of block capture particles into the microwells 3 and application of vacuum and five washes with 100 μL PBS at 10 mbar. For capture particles of 100 μm, the solution 100 μL contained ~300 microparticles allowing approximate 90% of the microwells to each be filled with 1 capture particle.

To demonstrate the ability of the surface(s) 20 of capture particle(s) 5 to serve as the binding surface in the microwell 3 to capture affinity agents 6, the microwell 3 with capture particles 5 were reacted with biotin as a reagent 8 capable of binding to the surface 20 of particle 5 according to FIG. 1.

Biotin was used as the reagent 8 capable of binding to the surface(s) 20 of particle(s) 5 in the microwell 3. To measure this binding, microwell 3 with capture particles 5 where treated with 200 μL of biotin conjugated to fluorescent dye (Biotin-Atto 550 Sigma-Aldrich) at 1 μg/mL in blocking buffer or 200 μL of fluorescent nanoparticles (FluoSpheres™ biotin-labeled nanoparticles, 40 nm diameter, ThermoFisher Scientific) at 1% in blocking buffer in the filtering device described above for a 1 min incubation with vacuum off followed by 40 mbar vacuum applied to the waste collection chamber to remove liquid and washing four times with 200 uL of PBS with 0.05% Tween-20 to remove all liquid containing un-bound materials.

After washing, microwell 3 and a size exclusion filter 4 were removed from the filtering system, and the bottom of the size exclusion filter 4 was dried and placed on a glass slide for imaging. Images were captured using a Leica M205 FA fluorescence stereomicroscope and DFC-7000T camera (Leica Microsystems, Wetzlar, Germany) was used for imaging. Microparticle filtration was assessed by analyzing images using Gen5 software from the Lionheart FX Live Cell Imager (Biotek, Winooski, VT, USA) to determine the fluorescence intensity of fluorescent dye and nanoparticles captured.

Figure 4A:
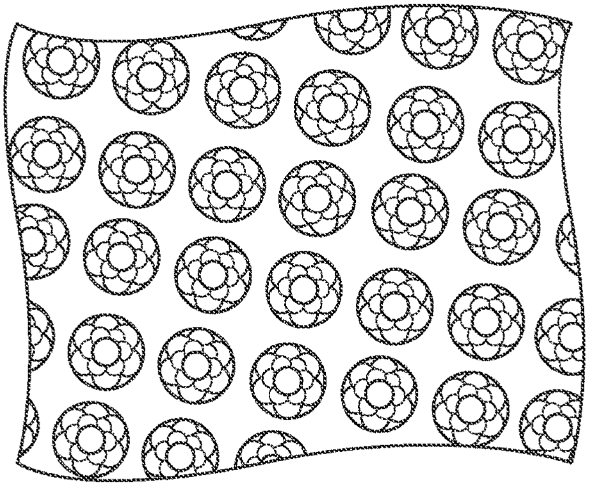
FIGS. 4A-4C are photographs of capture particles binded to biotin as a reagent when the capture particles were 18 μm (FIG. 4A), 50 μm (FIG. 4B) or 100 μm (FIG. 4C) diameter particles and wherein the biotin was conjugated to fluorescent dye (FIGS. 4A-4B) and nanoparticles (FIG. 4C).
Figure 4B:
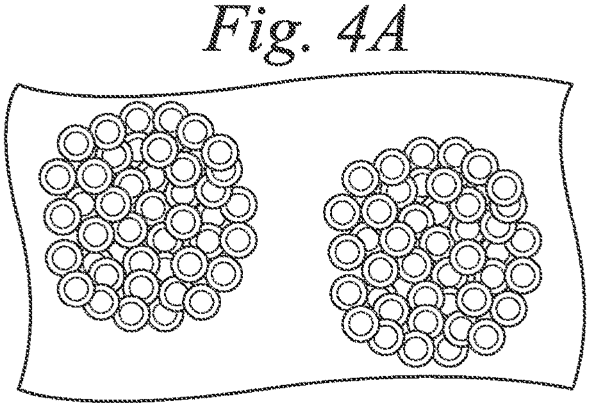
Figure 4C:
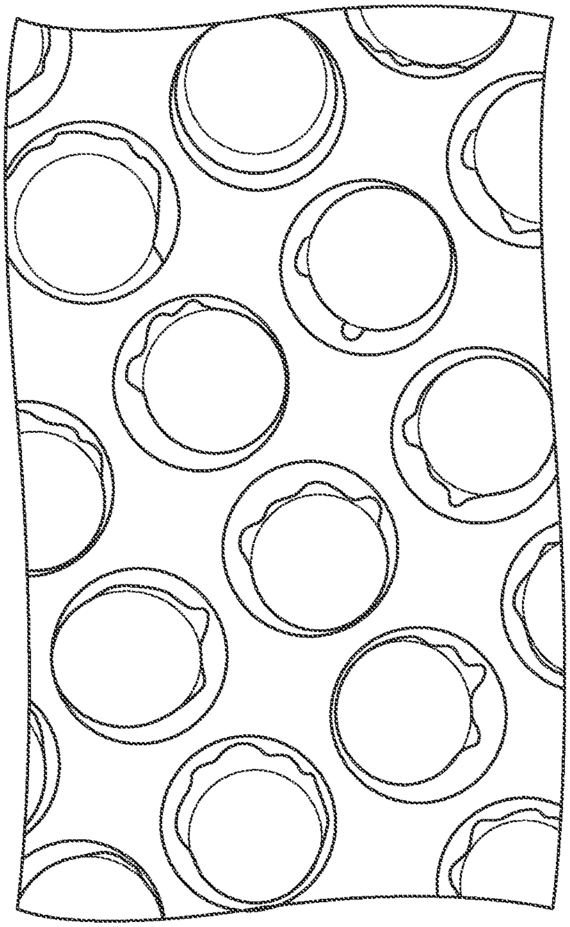

According to images shown in FIG. 4, capture particles 5 were capable of being completely bound to biotin when the capture particles were 18 μm (FIG. 4A), 50 μm (FIG. 4B) or 100 μm (FIG. 4C) diameters particles and whether the biotin was conjugated to fluorescent dye (FIGS. 4A-4B) or nanoparticles (FIG. 4C). Additionally, the biotin was only bound to capture particles and excess materials completely washed clean from microwells 3 and with size exclusion filters 4. No capture particles 5 were observed in a microwell 3 if the diameter of the capture particles was greater than the diameter of the microwell 3 (e.g. >=150 μm). When a 100 μm diameter capture particle 5 was place into a 110 μm diameter microwell, the gap between the microwell wall and the capture particle 5 was ~10 μm on average. This allowed gaps of sufficient size for the passage of cells and the sample matrix. The individual seeding of 100 μm diameter capture particle 5 was concentration dependent, i.e. suspensions including a number of particles equal to or less than the number of wells tended to seed individually.

Figure 5B:
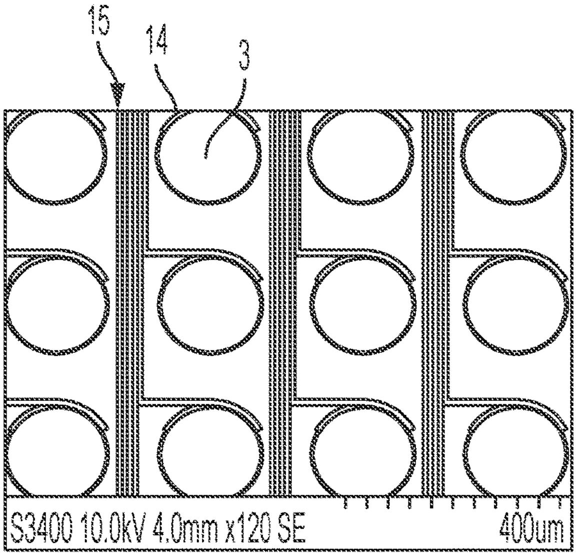
FIG. 5B is an isolated enlarged plan view of a portion of the semiconductor wafer shown in FIG. 5A showing the electrode at the top of each microwell.
Figure 5A:
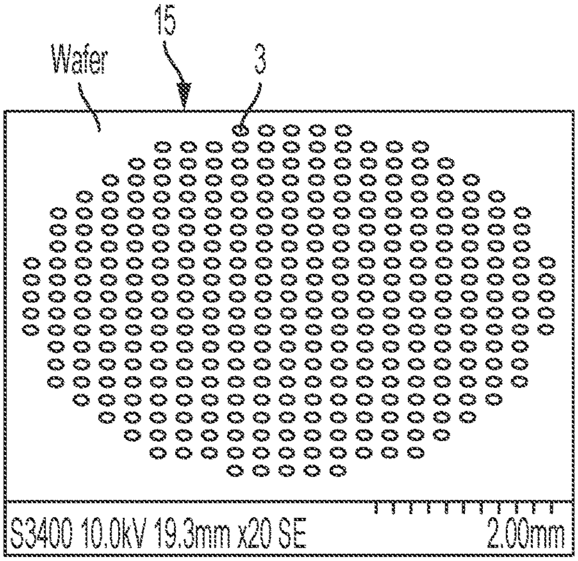
FIG. 5A is an SEM perspective image of a portion of a semiconductor (e.g., Si) wafer including an array of microwells, in accordance with the principles of the present invention, including at a top of each microwell an electrode (seen best in FIGS. 5B-5C) and including at the bottom of each or all of the microwells a size exclusion filter, wherein each size exclusion filter includes a plurality of pores, in an example, elongated slots, and wherein each microelectrode is coupled to an electrode circuit trace formed on a top surface of the semiconductor wafer, which electrode circuit trace is useable for applying in electrical signal to the microelectrode.
Figure 5C:
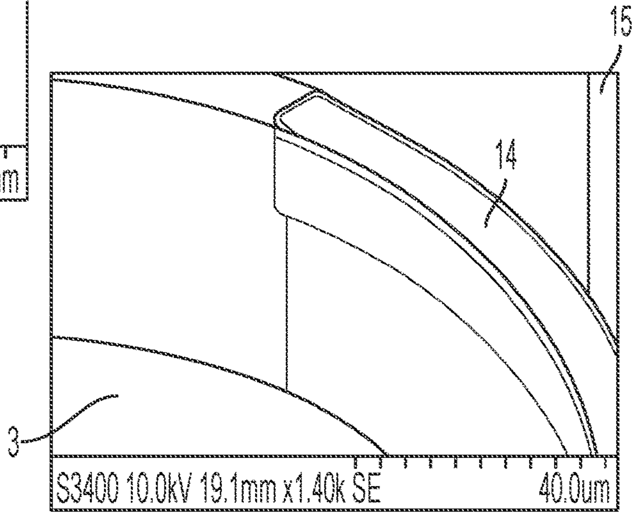
FIG. 5C is an isolated enlarged perspective view of a portion of one microwells shown in FIGS. 5A-5B including the electrode at the top of the microwell.

Method to make Electrodes in a Microwell:

FIGS. 5A-5C show scanning electron microscope (SEM) images of an array of microwells 3 with curved working electrodes 14 and electrode circuit traces 15 on or at the top surface of the first layer (FIGS. 5A-5B) and, an isolated, enlarged view of a single working electrode 14 at the top of a microwell 3 (FIG. 5C). Wherein, in this example, the first layer is formed from a semiconductor wafer, the fabrication of working electrodes 14 in microwells 3 was accomplished by adding electrode circuit traces 15 and electrodes 14 by patting and etching the "topside" of the first layer, then filling the etched portions of the first layer with copper via electroplating. Conductive gold was then patterned on the electrodes 14 using a photolithography lift-off and sputtering process. A silicon oxide protective layer was then deposited to protect the electrodes 14 interfacing to the microwells 3. If optional reference electrodes 16 (not shown in FIGS. 5A-5C) are also to be provided on or at the top surface of the first layer, said reference electrodes 16 may be formed in the same manner as the working electrodes 14.

Where electrically non-conductive inert material is used to form first layer, curved working electrodes 14, reference electrodes 16 (if provided at the top of microwell(s) 3 (as shown in dashed lines in FIGS. 1, 2, and 3D)) and electrode circuit traces 15 can be formed in a manner known in the art.

In some non-limiting embodiments or examples, instead of a reference electrodes 16 at the top of microwell(s) 3 (as shown in dashed lines in FIGS. 1, 2, and 3D) an electrically conductive reference electrode 16 (See FIG. 3D) can be formed around the bottom of the size exclusion filter 4 of each microwell 3, i.e., on the bottom or downward facing surface of the second layer. Also or alternatively to the reference electrode 16 being formed around the bottom of the size exclusion filter 4, in some non-limiting embodiments or examples, the bottom (i.e., the capillary 13 side) of the size exclusion filter 4 of each microwell 3 may be coated with an electrically conductive material 17 (e.g., gold), whereupon the size exclusion filter 4 coated with the electrically conductive material may also or alternatively be used as a or the reference electrode.

Method to Make the Capture Surface in a Microwell:

In some non-limiting embodiments or examples, as shown by example in FIG. 2, an interior surface 18 of the microwell 3 may serve as a binding or capture surface capable of binding affinity agents 6 for capture. In an example, this may occur by sputtering a conductive film 19 (e.g., gold) onto the inner or interior surface 18 of microwell 3 thereby generating a linker arm S for attachment of affinity agents 6 for capture to the interior surface 18. This fabrication starts with dissolving 1.0 mM of 11-Mercapotundecanoic acid (11-MUA) into 50 mM phosphate buffer solution at pH 10. Next the solution is added to each microwell 3 including the conducive film on the interior surface 18 and allow to sit overnight (1-7 hours). Wash with water 5 times and heating at 37 C until dry. The terminal carboxylic groups (of 11-MUA) were then activated for 1 h in 75 mM N-(3-dimethylaminopropyl)-N-ethylcarbodiimide hydrochloride (EDC) and 15 mM (N-hydroxy-succinimide ester (NHSS) in 50 mM phosphate buffer solution at pH 6.1. Next, the interior surface 18, in its capacity as the capture surface, is generated with a high affinity agent, for example, neutradvidin was dissolved in water at 1.0 mg/mL into 50 mM phosphate buffer at pH 8 and applied to interior surface 18 and reacted for 30 min to immobilize at 37° C. until dry.

In some non-limiting embodiments or examples, the interior surface 22 of the size exclusion filter 4 facing the microwell 3 (i.e., the surface 22 of the size exclusion filter 4 facing upward in FIG. 2) may also or alternatively be used as a capture surface by covering it with an electrical conductor, such as gold, silver, or another reactive metal (as an electrode material 23), able to be functionalized with 11-mercaptoundecannoic (11-MUA) acid, 1-ethyl-3-(-3-dimethylaminopropyl) carbodiimide (EDC) and N-hydroxysulfosuccinimide (NHSS) followed by attachment of binding agents like neutravidin, anti-FITC, anti-Digitoxin, and other affinity agent. This forms a capture surface 5 in the microwell 3 using a reagent 8 capable of binding of reagent attached to affinity agents 6 for capture, for example Biotin, FITC, Digitoxin and etc. In other cases, the affinity agents for target analytes are directly bound onto the working electrode 14. In all cases this forms a layer on the surface of the electrode(s) placed on the size exclusion filter 4 (FIG. 2). The use of unique affinity agent surfaces in each microelectrode allowed multiplexed results.

In some non-limiting embodiments or examples, one or more electrical signals may be applied, e.g., via working electrode 14, separately or simultaneously to the conductive film 19 on the interior surface 18 of microwell 3 and/or the electrode material 23 placed on the surface 22 of the size exclusion filter 4. To this end, in some non-limiting embodiments or examples, working electrode 14 may be electrically coupled to conductive film 19, electrode material 23, or both in any suitable and/or desirable manner.

Method to Demonstrate Capture of Target Analyte on Capture Surface in Microwell:

To demonstrate the ability to functionalize the binding surface(s 5 in the microwell 3 according to FIG. 1 or 2 to capture affinity agents 6 as complexes with target analytes 1, complex samples with target analytes 1 were bound and separated from non-target analytes 2. This binding was demonstrated with neutravidin capture surfaces (2 μg/microwell) or neutravidin capture particles by reacted with SKBR3 cells as an example of target analytes 1 and biotinylated antibodies for SKBR3 cells as an example of affinity agent in complex sample. The procedure was followed to mix 900 μL of complex samples mixed with 1000 SKBR3 cells stained with blue fluorescent DAPI and 25 μg of biotin conjugated Her2/neu-specific mAb labeled with red fluorescent DyLight™-550. After incubation and washing as described above, the microwells 3 and capture surfaces 5 were imaged as described above for the amount of blue and red fluorescence to demonstrate that only target analytes 1 (e.g. SKBR cells) and affinity agents 6 for capture (e.g. Her2/neu-specific mAb) were bound to the capture surfaces 5 and non-target analytes 2 were completely washed from microwell 3 and size exclusion filters 4.

The image analysis clearly showed the microwell 3 and the size exclusion filter 4 was able to cleanly capture the cells from complex whole blood sample lysed with PBS and demonstrated to allow high sensitivity imaging immunoassays at 60,000 copies of oncoprotein per single cell. This demonstrated capture affinity agents 6 as complexes with target analytes components 1. There was no non-specific binding detected on the microwell 3 and size exclusion filter 4. Additionally, all the wash buffers, cell lysis solutions, and detergents used for lysing red blood cells and leaving mononuclear cells or lysing all cells including residual white blood cells and bacteria were not an issue for the processing and capture of complexes and remove of non-target components.

Additionally, the ability to remove non-target components of the sample was determined by processing differing amounts and types of complex samples and measuring any clogging or loss of filtering ability. The complex sample processing capability was demonstrated as ~0.9 mL of whole blood, urine and wound sponge lavage fluid specimens in a 35 $mm^2$ area of the size of well of a standard 96-well plate. Extension to other fluids such as cerebral spinal fluid, sputum, or bronchial/nasal lavage did not pose a risk. For comparison, process of sample fluid volume of greater than 0.1 mL were an issue for clogging, whether whole blood lysate, urine or wound sample, when using polycarbonate track-etched (PCTE) membranes (8.0 μm pores at 1000 pores/$mm^2$ for a total pore area of 1.8 $mm^2$ per well of a standard 96-well plate). While not being bound to theory, this improved processing may be due greater porosity using the larger 9 μm×21 μm pores of the size exclusion filter 4 packed into a tight uniform pattern to increase the pore density to >4000 pores/$mm^2$ which increased the total pore area to 78% of the total surface area of the size exclusion filter 4 (i.e., the upper surface of the second layer) in alignment with the microwell 3 through routing of the sample flow is limited to being only through the 341 microwells 3 of 100 μm diameter. In contrast, prior art filtering devices having 8 μm diameter pores at a pore density >1000 pores/$mm^2$ had a total pore area of only 5% of the total surface area. In some non-limiting embodiments or examples, Applicant discovered that a minimum pore area greater than the 20% of the total surface area was required to pass complex sample(s).

Example 2: Method for Isolating and Detection of Target Analytes from Complex Samples The examples shown in FIGS. 1 and 2 have couple target analytes with the affinity agents for a target analyte 6 for capture and a target analyte 7 for detection forming a complex(es) which may be separated from the other non-target components 2 of the sample. Wherein target analytes are coupled to a binding surface 5 in the microwell 3. The affinity agents 7 for detection have reagent 9 capable of generation of electrochemical labels 10 in the microwell allowing an immunoassay detection (EC-IA) directly on the binding surface 5 in the microwell 3. In the follow example, the microwell 3 used was 110 μm diameter holding ~10 nL of liquid and fabricated according to Example 1 with electrodes in the microwell 3 and both types of capture surfaces. The reagent 9 capable of generation of electrochemical labels 10 attached to affinity agents 7 attached was alkaline phosphatase (ALP). ALP generates para-amino phenol (AP) as the electrochemical label 10 from para-amino-phenyl phosphate (APP) for electrochemical analysis. The affinity agents 6 for capture use biotin as the reagent 8 capable of binding to neutravidin surface 5 in the microwell 3. This example uses a polyclonal antibody to the same pathogen for both the affinity agents for the target analyte 6 for capture and the target analyte 7 for detection and demonstrate specific isolation and detection of these pathogen form urine as an example of a complex sample having other non-target components 2.

Materials:

| | |
|---|---|
| Micro-organisms and antibodies | Bacterial cells and antigens and antibodies *Pseudomonas aeruginosa* (ATCC ® 27853 ™), *Escherichia coli* (ATCC ® 25922 ™, AR-Bank #0077 and #0086), *Staphylococcus aureus* (ATCC ® 27661 ™), and *Klebsiella pneumoniae* (ATCC ® 13883 ™) bacterial stocks were generated by standard microbiologic culture practices. Bacterial polyclonal antibodies recognizing *S. aureus* (Thermo Fisher Scientific), *E. coli* (MyBioSource, San Diego, CA, USA), *K. pneumoniae* (Thermo Fisher Scientific) and *P. aeruginosa* (Abeam, Cambridge, UK) were purchased |
| Attachment of reagents to affinity agents | Antibodies separately conjugated to ALP (Thermo Fisher Scientific) using the FastLink ALP kit (Abnova, Taipei City, Taiwan), and to biotin-PEG4 and to Dylight 488 using the EZ-Link NHS-conjugation kits (Thermo Fisher Scientific). The resultant antibody conjugates were stored at 4° C. |
| Cell lysates | Cell lysates were prepared for analysis by diluted 1:1 in PBS and sonicating using a Q500 device with a cup-horn attachment (Qsonica, Hartford, CT, USA) at 4° C. Sonication at 88% amplitude was carried out for 45 min in total (3-s pulses with 3-s gaps, 22.5 min of sonication). |

Electrochemical Immunoassay Procedure:

The electrochemical immunoassay principle the pathogen was demonstrated using bacterial polyclonal antibodies for either *S. aureus, E. coli, K. pneumoniae* or *P. aeruginosa* as affinity reagents from suppliers listed above in a sandwich assay pair by placing an affinity label (biotin) some of the polyclonal antibody and placing a detection method (ALP) on the remain polyclonal antibody using conjugation methods listed above to attach by linkage arm. Cell lysates form each micro-organisms were produced by culture followed by sonication as listed above. Cell lysates were added as the target analytes and urine samples lacking any micro-organism to produce samples for performance testing. Lysate samples concentrations were prepared for testing 0 and 1000 cell/mL or higher. The assay was performed by adding 48 μL of the biotinylated *S. aureus, E. coli, K. pneumoniae* or *P. aeruginsa* polyclonal antibodies (0.75 μg/assay) and 30 μL of the same polyclonal antibodies conjugated to ALP (1.50 μg/assay) to 100 μL of the lysate sample or calibrators with 0, 5, 10, 20, 30, 40 and 50 thousand cells or lysate equivalent per assay and sealed in a polypropylene 96-well sample plate. Duplicate samples and controls were incubated on a plate shaker at 35° C., 800 rpm, for 1 hour to form the complex with the affinity agent for detection and capture of target analytes.

Figure 6:
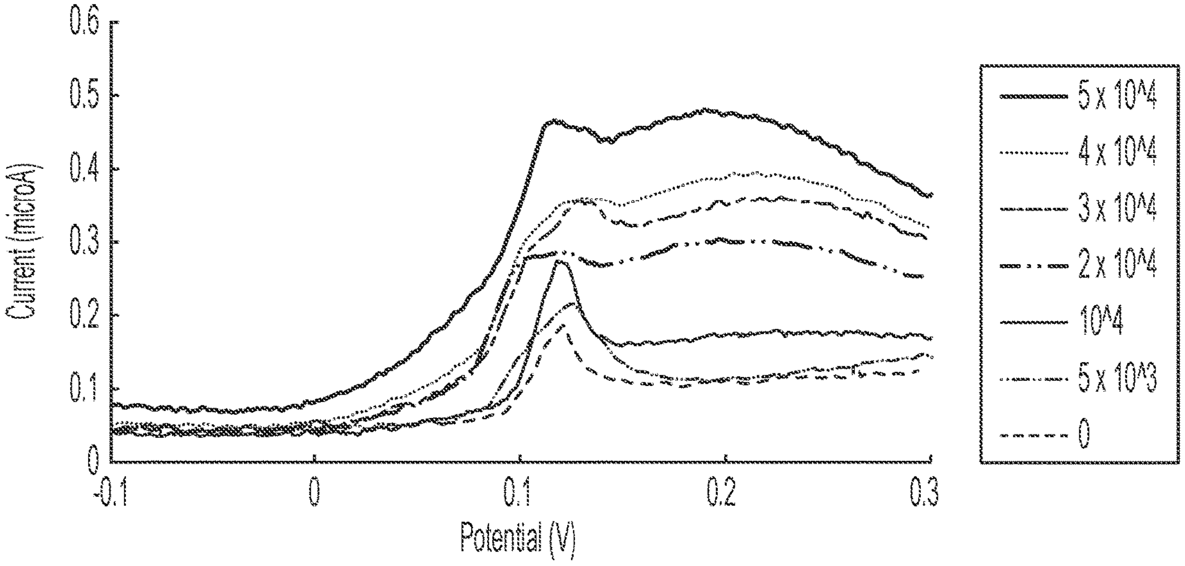
FIG. 6 shows the plots of electrochemical signals generated as current in μA (Y-axis) plotted against the voltage (V) (X-axis) for the immunoassay detection (EC-IA) directly on the binding surface for samples including 0, $5\times10^{-3}$, $10^{-4}$, $2\times10^{-4}$, $3\times10^{-4}$, $4\times10^{x4}$ or $5\times10^{-4}$ lysate equivalent of bacterial cells per assay (Y-axis). The drawings herein are provided to facilitate the understanding of the principles described herein, and are provided by way of illustration and not limitation on the scope of the appended claims. The drawings are not to scale.

The complex of target analyte with the affinity agents was immediately captured on solid surfaces using neutravidin as the binding surface. The non-target analyte either according to the rapid sample processing procedure described above with a size exclusion filter or with standard 96-well plate washer for neutravidin coated 96-well plates. The washing procedure in both cases was to remove liquid and washing four times with 200 μL of PBS with 0.05% Tween-20 to remove all liquid including un-bound materials. After washing 150 μL of 1.05 mM 4-aminophenyl phosphate (pAPP) in 100 mM TRIS buffer with 600 mM NaC1, and 5 μM $MgCl_2$ adjusted to pH 9.0 was added to allow conversion to 4-aminophenol (AP) as electrochemical label for measurements at 3-6 min. The label was measured by the change in current at constant voltage across the working and counter electrodes (FIG. 6). In all cases, rapid removal of non-target analyte not binding to the affinity agents was measured by the background signal in absence of any bacterial lysate as target antigen. The 4-aminophenol (AP) generated (150 μL) was transferred to separate electrode for the reading and determining sensitivity and background signal for the EC-IA method.

For comparison, electrochemical sensitivity of the immunoassay detection (EC-IA) directly on the binding surface 5 with the working electrode modified to functionalize the surface with neutravidin by 11-MUA, EDC and HHSS method as described above was compared to the electrochemical sensitivity of the same commercially available gold screen-printed electrodes (SPE) lacking modification. Electrochemical signals generated by the conversion of pAPP to p-aminophenol (pAP) by ALP were measured using square wave voltammetry signals and were acquired using the μSTAT 8000 (Metrochm Riverside FL) in a 96 well format (DRF 220-96, Metrohm) to measure the amount of ALP in 150 μL using p-amino phenyl phosphate (pAPP) (Syncomm 96x, Dropview 8400 software). FIG. 6 shows the electrochemical signal generated as current in μA plotted against the voltage (V) for the immunoassay detection (EC-IA) directly on the binding surface for samples including either 0, 5, 10, 20, 30, 40 or 50 thousand lysate equivalent of bacterial cells per assay. This electrochemical immunoassay (EC-IA) method was additionally compared to optical immunoassay (OP-IA) using respective ALP optical labels para-nitrophenyl-phosphate and analysis in a standard 96 well optical plate reader (Biotek).

The immunoassay detection (EC-IA) directly on the binding surface 5 bacterial immunoassay method achieved a quantitative enumeration of cell counts across a range of 5,000 to 40,000 bacteria per sample. The limit of detection was 1,000 bacteria per sample was comparable to the electrochemical sensitivity of the same commercially available gold screen-printed electrodes (SPE) lacking modification. However, the modification had a significant un-expected benefit of as average peak maximum shifted to 0.2 V away from the known problematic absorption spikes observed with pAPP at 0.12 V (FIG. 6). The unmodified commercially available gold screen-printed electrodes (SPE) average peak maximum also at 0.12 resulting in false positive result in the absence of bacteria and loss of specificity and reproducibility. Typically, this absorption spike is in the way of the signal and requires cycling to be avoided and requires expensive fabrication of interdigitated electrodes array (IDE). While not being bound to theory, the second affinity agent tagged with alkaline phosphatase (ALP) is therefore brought to the microelectrode monolayers surface for enhanced electrochemical signal generation. This new method eliminated the need to use interdigitated electrodes array. Additionally, electrochemical immunoassay more slightly sensitive than the optical method to able to detect 1000 bacteria per mL in this format and the read time was reduced form 30 min to 3 min. The immunoassay method was 99% specific for *S. aureus, E. coli*, and *K. pneumoniae*, with a 50% cross reactivity between *K. pneumoniae* and *E. coli*. The polyclonal antibodies only achieved a sensitivity of $10^4$ bacteria per sample with EC-IA and not OP-IA.

Electrochemical Measurements in Microwell:

Electrochemical analysis was preformed after loading microwells with 100 μm diameter neutravidin capture particles treated to bind varying amounts of biotinylated ALP from 0, 43 fM, 108 fM, 240 fM, and 3.3 pM per particles. The microparticles were individually into each microwells as previously described and two electrodes placed in the microwell where used to measure the change in current between microwells with and without ALP on the capture bead surfaces. The microwells were filled with 1 μM p-aminophenyl phosphate (pAPP) in 100 mM Tris-buffered saline (pH 9.0) including 1 mg/mL $MgCl_2$ and 0.6 M NaCl, and measurement started immediately. The microparticle with 43 fM ALP produced 2.4 μA of signal while microparticle with 0 fM ALP produced 0.02 μA of signal. The detection limit for electrochemical measurements in microwell was found to be 6.6 fM of ALP.

By comparison, commercial SPE electrode in a large well using a 150 μL detection volume was able to detect $10^4$ bacteria corresponding to ALP of ~100 pM by producing a current change of 0.15 μA. This signal also corresponded to the generation of $10^{-7}$ M p-amino phenol (pAP) and was confirmed to require 30 microparticles each including 3.3 pM ALP placed into the large well for ~100 pM. Therefore, the microwell measurement produces 53.4 μA/pM vs the current technology of 0.0015 μA/pM for amplification factor of $3.5\times10^4$. While not being bound to theory, it is believed the concentrating of all generated electrochemical label into 10 nL microwell instead of the 150 μL well provides at least 15000-fold of this amplification whereas the close proximity of the electrochemical label generated to the working electrode surface provides further amplification.

Additionally, the electrochemical detection amplification in microwell 3 with a size exclusion filter 4 allows for detection of far lower amounts of target analyte by electrochemical immunoassay (EC-IA) and lowered the sensitivity for bacteria down to below 10 cells per sample. Immunoassay specificity was still not impacted by the sample matrix, and no interference from complex samples. Therefore, the invention was an improvement in the ability to detect biomolecule and cells compared to polymerase chain reaction (PCR) reaction commonly used. The PCR sensitivity for 16S and CTXM gene was 100-1000 bacteria cells in clean buffers samples but only $10^5$ bacteria cells in complex samples. This sample interference was due to the presence of cell-free DNA, which impacted the PCR background. This was observed whether tested directly from a 1 mL sample using standard DNA purification methods or from bacteria isolated using size exclusion filtration principles.

Method to Release Biomolecules from Isolated Cells:

In some non-limiting embodiments or examples, the content of the target cells isolated in the microwells 3 shown in FIG. 1 and FIG. 2 may be released by incubating the isolated cells with a reagent capable of releasing biomolecule for passage through the size exclusion filter 4 and into a capillary 13 below the size exclusion filter 4. For example, the lysis efficiency for BPERII surfactant as compared to sonication was 99.8% for removal of bacterial biomolecule from the size exclusion filter, and BPERII did not interfere with the immunoassay (IA) or PCR DNA assays. This allows for post-analysis confirmatory DNA and IA analysis. Both β-lactamase cefotaximase gene (CTX-M) antimicrobial resistance (AMR) gene and 16S species identification gene from resistant *E.coli* assay were demonstrated with capture and release of $10^4$ bacteria. Application hydrodynamic force of ~100 mbar to the size exclusion filter with BERPII removed >99.5% of cell antigens and DNA from the cell trapped on the membrane after filtering 1 mL of a complex sample and capturing as many as 10/\5 cells. Additionally, the format allows the extracted materials to be held into the capillary stop beneath the size exclusion filter by removal of the hydrodynamic force. The removal of this material was later removed from the capillary by application of vacuum and/or voltage as spray VIII Kits:

In some non-limiting embodiments or examples, the apparatus and reagents for conducting methods in accordance with the principles described herein may be present in a kit useful for conveniently performing the methods. In one embodiment, a kit comprises in packaged combination affinity agents for one or more different target analytes to be isolated. The kit may also comprise the porous matrix, collection particles, and solutions for spraying, filtering and reacting the analytical labels. The composition of the analyte detection particles may be, for example, as described above. Porous matrices and electrodes may be in an assembly where the assembly can have vents, capillaries, chambers, liquid inlets and outlets. The porous matrix can be removable or permanently fixed to the assembly.

Depending on the method used for analysis of target analytes, reagents discussed in more detail herein below may or may not be used to treat the samples prior to, during, or after the extraction of analytes from the target analytes.

The relative amounts of the various reagents in the kits can be varied widely to provide for concentrations of the reagents that substantially optimize the reactions that need to occur during the present methods and further to optimize the sensitivity of the methods. Under appropriate circumstances one or more of the reagents in the kit may be provided as a dry powder, usually lyophilized, including excipients, which on dissolution provide for a reagent solution having the appropriate concentrations for performing a method in accordance with the principles described herein. The kit may further include a written description of a method utilizing reagents in accordance with the principles described herein.

Cell lysis reagents are those that involve disruption of the integrity of the cellular membrane with a lytic agent, thereby releasing intracellular contents of the cells. Numerous lytic agents are known in the art. Lytic agents that may be employed may be physical and/or chemical agents. Physical lytic agents include, blending, grinding, and sonication, and combinations or two or more thereof, for example. Chemical lytic agents include, but are not limited to, non-ionic detergents, anionic detergents, amphoteric detergents, low ionic strength aqueous solutions (hypotonic solutions), bacterial agents, and antibodies that cause complement dependent lysis, and combinations of two or more thereof, for example, and combinations or two or more of the above. Non-ionic detergents that may be employed as the lytic agent include both synthetic detergents and natural detergents.

The nature and amount or concentration of lytic agent employed depends on the nature of the cells, the nature of the cellular contents, the nature of the analysis to be carried out, and the nature of the lytic agent, for example. The amount of the lytic agent is at least sufficient to cause lysis of cells to release contents of the cells. In some non-limiting embodiments or examples, the amount of the lytic agent is (percentages are by weight) about 0.0001% to about 0.5%.

Removal of lipids may be carried out using, by way of illustration and not limitation, detergents, surfactants, solvents, and binding agents, and combinations of two or more of the above. The use of a surfactant or a detergent as a lytic agent as discussed above accomplishes both cell lysis and removal of lipids. The amount of the agent for removing lipids is at least sufficient to remove at least about 50%, or at least about 90%, or at least about 95% of lipids from the cellular membrane. In some non-limiting embodiments or examples, the amount of the lytic agent is (percentages by weight) about 0.0001% to about 0.5%.

In some non-limiting embodiments or examples, it may be desirable to remove or denature proteins from the cells, which may be accomplished using a proteolytic agent such as, but not limited to, proteases, heat, acids, phenols, and guanidinium salts, and combinations of two or more thereof, for example. The amount of the proteolytic agent is at least sufficient to degrade at least about 50%, or at least about 90%, or at least about 95% of proteins in the cells. In some non-limiting embodiments or examples, the amount of the lytic agent is (percentages by weight) about 0.0001% to about 0.5%.

In some non-limiting embodiments or examples, samples are collected from the body of a subject into a suitable container such as, but not limited to, a cup, a bag, a bottle, capillary, or a needle, for example. Blood samples may be collected into Vacutainer® containers, for example. The container may contain a collection medium into which the sample is delivered. The collection medium may be either dry or liquid and may comprise an amount of platelet deactivation agent effective to achieve deactivation of platelets in the blood sample when mixed with the blood sample.

Platelet deactivation agents can be added to the sample such as, but are not limited to, chelating agents such as, for example, chelating agents that comprise a triacetic acid moiety or a salt thereof, a tetraacetic acid moiety or a salt thereof, a pentaacetic acid moiety or a salt thereof, or a hexaacetic acid moiety or a salt thereof. In some non-limiting embodiments or examples, the chelating agent is ethylene diamine tetraacetic acid (EDA) and its salts or ethylene glycol tetraacetate (EGTA) and its salts. The effective amount of platelet deactivation agent is dependent on one or more of the nature of the platelet deactivation agent, the nature of the blood sample, level of platelet activation and ionic strength, for example. In some non-limiting embodiments or examples, for EDTA as the anti-platelet agent, the amount of dry EDTA in the container is that which will produce a concentration of about 1.0 to about 2.0 mg/mL of blood, or about 1.5 mg/mL of the blood. The amount of the platelet deactivation agent is that which is sufficient to achieve at least about 90%, or at least about 95%, or at least about 99% of platelet deactivation. Moderate temperatures are normally employed, which may range from about 5° C. to about 70° C. or from about 15° C. to about 70° C. or from about 20° C. to about 45° C., for example. The time period for an incubation period is about 0.2 seconds to about 6 hours, or about 2 seconds to about 1 hour, or about 1 to about 5 minutes, for example.

In some non-limiting embodiments or examples, the above combination may be provided in an aqueous medium, which may be solely water or which may also contain organic solvents such as, for example, polar aprotic or protic solvents such as, e.g., dimethylsulfoxide (DMSO), dimethylformamide (DMF), acetonitrile, an organic acid, or an alcohol, and non-polar solvents miscible with water such as, e.g., dioxane, in an amount of about 0.1% to about 50%, or about 1% to about 50%, or about 5% to about 50%, or about 1% to about 40%, by volume.

An amount of aqueous medium employed is dependent on a number of factors such as, but not limited to, the nature and amount of the sample, the nature and amount of the reagents, the stability of target cells, and the stability of target analytes, for example. In some non-limiting embodiments or examples, in accordance with the principles described herein, the amount of aqueous medium per 10 mL of sample is about 5 mL to about 100 mL.

Where one or more of the target analytes are part of a cell, the aqueous medium may also comprise a lysing agent for lysing of cells. A lysing agent is a compound or mixture of compounds that disrupt the integrity of the matrices of cells thereby releasing intracellular contents of the cells. Examples of lysing agents include, but are not limited to, non-ionic detergents, anionic detergents, amphoteric detergents, low ionic strength aqueous solutions (hypotonic solutions), bacterial agents, aliphatic aldehydes, and antibodies that cause complement dependent lysis, for example. Various ancillary materials may be present in the dilution medium. All of the materials in the aqueous medium are present in a concentration or amount sufficient to achieve the desired effect or function.

In some non-limiting embodiments or examples, it may be desirable to fix the proteins, peptides, nucleic acids or cells of the sample. Fixation immobilizes and preserves the structure of proteins, peptides and nucleic acids and maintains the cells in a condition that closely resembles the cells in an in vivo-like condition and one in which the antigens of interest are able to be recognized by a specific affinity agent. The amount of fixative employed is that which preserves the nucleic acids or cells but does not lead to erroneous results in a subsequent assay. The amount of fixative depends on one or more of the nature of the fixative and the nature of the cells, for example. In some non-limiting embodiments or examples, the amount of fixative is about 0.05% to about 0.15% or about 0.05% to about 0.10%, or about 0.10% to about 0.15%, for example, by weight. Agents for carrying out fixation of the cells include, but are not limited to, cross-linking agents such as, for example, an aldehyde reagent (such as, e.g., formaldehyde, glutaraldehyde, and paraformaldehyde,); an alcohol (such as, e.g., $C_1$-$C_5$ alcohols such as methanol, ethanol and isopropanol); a ketone (such as a $C_3$-$C_5$ ketone such as acetone); for example. The designations $C_1$-$C_5$ or $C_3$-$C_5$ refer to the number of carbon atoms in the alcohol or ketone. One or more washing steps may be carried out on the fixed cells using a buffered aqueous medium.

In examples in which fixation is employed, extraction of nucleic acids can include a procedure for de-fixation prior to amplification. De-fixation may be accomplished employing, by way of illustration and not limitation, heat or chemicals capable of reversing cross-linking bonds, or a combination of both, for example.

In some non-limiting embodiments or examples, utilizing the techniques, it may be necessary to subject the rare cells to permeabilization. Permeabilization provides access through the cell membrane to nucleic acids of interest. The amount of permeabilization agent employed is that which disrupts the cell membrane and permits access to the nucleic acids. The amount of permeabilization agent depends on one or more of the nature of the permeabilization agent and the nature and amount of the rare cells, for example. In some non-limiting embodiments or examples, the amount of permeabilization agent by weight is about 0.1% to about 0.5%. Agents for carrying out permeabilization of the rare cells include, but are not limited to, an alcohol (such as, e.g., $C_1$-$C_5$ alcohols such as methanol and ethanol); a ketone (such as a $C_3$-$C_5$ ketone such as acetone); a detergent (such as, e.g., saponin, Triton® X-100, and Tween®-20); for example. One or more washing steps may be carried out on the permeabilized cells using a buffered aqueous medium.

As can be seen, disclosed herein, in some non-limiting embodiments or examples, is a method and apparatus for collecting target analytes 1 and isolating the target analytes 1 from non-target components 2 in a microwell 3 with a size exclusion filter 4 by affinity agents 6 for capture capable of binding to a binding surface 18, 20, 22 in or of the microwell 3.

Also disclosed, in some non-limiting embodiments or examples, is a method and apparatus for collecting target analytes 1 and isolating the target analytes 1 from non-target components 2 in a microwell 3 with a size exclusion filter 4 by affinity agents 6 for capture capable of binding to a binding surface 18, 20, 22 in or of the microwell 3 and affinity agents 7 for detection capable of generation of electrochemical labels 10 in the microwell 3.

In some non-limiting embodiments or examples, the binding surface may be the surface 18 an electrode 19 formed on a surface of the microwell 3.

In some non-limiting embodiments or examples, the binding surface may be the surface 20 of a particle 5 disposed in the microwell 3, said particle having a diameter greater than a pore size of the size exclusion filter 4.

In some non-limiting embodiments or examples, the binding surface may be an electrode 23 placed on a surface 22 of the size exclusion filter 4.

In some non-limiting embodiments or examples, electrochemical label detection may be done by an electrode(s) in the microwell.

In some non-limiting embodiments or examples, the target analytes may be released into a vial or waste collection chamber from the size exclusion filter 4.

Finally, in some non-limiting embodiments or examples, the target analytes may be released into a capillary 13 from the size exclusion filter 4.

While the invention has been illustrated and described in detail in the drawings and foregoing description, the same is to be considered as illustrative and not restrictive in character, it being understood that only the representative embodiments have been shown and described and that all changes, equivalents, and modifications that come within the spirit of the inventions defined by the claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A filtering device for filtering target analytes from non-target components comprising:

an upper reagent well;

a first layer including first and second surfaces on opposite sides thereof, wherein the first and second surfaces define outer edges of the first layer, and wherein the first layer has a plurality of holes or openings extending between the first and second surfaces, wherein an end of each of the holes or openings of the first layer are in fluid communication with the upper reagent well; and a second layer coupled to the second surface of the first layer, the second layer including a plurality of size exclusion filters in alignment with the plurality of holes or openings of the first layer, said size exclusion filters including a plurality of pores in alignment with the plurality of holes or openings of the first layer; and a capillary in fluid communication with a side of the size exclusion filters opposite the upper reagent well.

2. The filtering device of claim 1, wherein each hole or opening has a minimum lateral dimension or diameter >100 μm.

3. The filtering device of claim 1, wherein each pore has a lateral dimension or diameter >10 μm.

4. The filtering device of claim 1, wherein each pore is in the shape of an elongated slot.

5. The filtering device of claim 4, wherein the elongated slot shape of each pore has an aspect ratio (length/width) >1.5.

6. The filtering device of claim 4, wherein:

the elongated slot shape of each pore has a width >1 μm and a length >2 μm; and a total area of the plurality of pores of the size exclusion filter is greater than 20% of an area of the size exclusion filter in alignment with the one hole or opening the pores align with.

7. The filtering device of claim 1, wherein each hole or opening has a minimum lateral dimension of >2 μm.

8. The filtering device of claim 7, wherein the minimum dimension is a diameter of each hole or opening.

9. The filtering device of claim 1, wherein:

each hole or opening and the size exclusion filter in alignment with the one hole or opening define a microwell; and the filtering device includes a binding surface on or in at least one microwell.

10. The filtering device of claim 9, wherein:

the at least one hole or opening has an interior surface coated with a conductive film; and the binding surface is defined by the conductive film on the interior surface of the hole or opening.

11. The filtering device of claim 9, wherein the binding surface is defined by an electrical conductor on a surface of the size exclusion filter that faces the at least one hole or opening.

12. The filtering device of claim 9, wherein:

the binding surface includes a surface of a particle in the microwell; and the particle has a maximum dimension greater than a largest dimension of at least one pore of the size exclusion filter.

13. The filtering device of claim 9, further including at least one electrode in at least one microwell.

14. The filtering device of claim 13, wherein the at least one electrode in at least one microwell includes:

an electrical conductor on an interior surface of the hole or opening;

an electrical conductor on a surface of the size exclusion filter that faces the hole or opening; or both.

15. The filtering device of claim 9, further including at least one electrode outside at least one microwell.

16. The filtering device of claim 15, wherein the at least one electrode outside the at least one microwell includes:

an electrical conductor around the at least one hole or opening on side of the second layer opposite the first layer;

an electrical conductor on a surface of the size exclusion filter that faces away from the at least one hole or opening; or both.

17. The filtering system of claim 1, further including: a waste collection vial or chamber coupled to an end of the capillary opposite the size exclusion filter.

18. The filtering system of claim 17, further including:

a vacuum pump operative for applying a vacuum to the side of the size exclusion filter opposite the upper reagent well.

* * * * *